(12) United States Patent
Hasegawa

(10) Patent No.: US 10,723,124 B2
(45) Date of Patent: Jul. 28, 2020

(54) RECORDING DEVICE AND RECORDING METHOD

(71) Applicant: SEIKO EPSON CORPORATION, Tokyo (JP)

(72) Inventor: Tomonaga Hasegawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/364,552

(22) Filed: Mar. 26, 2019

(65) Prior Publication Data
US 2019/0299595 A1 Oct. 3, 2019

(30) Foreign Application Priority Data
Mar. 28, 2018 (JP) .................................. 2018-061405

(51) Int. Cl.
*B41J 2/045* (2006.01)
*G06K 15/10* (2006.01)

(52) U.S. Cl.
CPC ....... *B41J 2/04505* (2013.01); *B41J 2/04586* (2013.01); *G06K 15/105* (2013.01)

(58) Field of Classification Search
CPC ...... B41J 2/04505; B41J 2/04586; B41J 2/14; B41J 2/21; B41J 29/38; G06K 15/10
See application file for complete search history.

(56) References Cited

U.S. PATENT DOCUMENTS 8,567,886 B2 * 10/2013 Yamaguchi .......... B41J 2/04543
347/12
2012/0026229 A1 2/2012 Kato et al.
2014/0009520 A1 1/2014 Hasegawa et al.
2019/0299608 A1* 10/2019 Maehira ................ G06F 3/1279

FOREIGN PATENT DOCUMENTS

JP H11-245384 A 9/1999
JP 2012-030512 A 2/2012
JP 2014-012374 A 1/2014

* cited by examiner

*Primary Examiner* — Thinh H Nguyen
(74) *Attorney, Agent, or Firm* — Foley & Lardner LLP

(57) ABSTRACT

When an overlap image is recorded that includes a first dot group in which first dots are successively formed by a first nozzle group at a predetermined interval in a first direction, a second dot group in which second dots are successively formed by a second nozzle group at the predetermined interval in the first direction, and a third dot group including the first dots and the second dots, which are arrayed at an interval longer than the predetermined interval, the first dot group and the second dot group are arranged at mutually exclusive positions, and the third dot group is arranged at at least one of positions adjacent, in a second direction that intersects with the first direction, to the first dot group and the second dot group.

6 Claims, 16 Drawing Sheets

RECORDING DEVICE AND RECORDING METHOD

BACKGROUND

1. Technical Field

The present invention relates to a recording device configured to perform recording by discharging droplets onto a recording medium, and a recording method.

2. Related Art

Hitherto, as an example of a recording device, there has been known an ink jet-type printer for performing recording (printing) of an image by discharging droplets (ink droplets) onto various recording media such as paper or a film to form a plurality of dots on the recording media. For example, the ink jet-type printer alternately repeats main scanning and sub-scanning. In the main scanning, a head including a plurality of nozzles is moved in a main scanning direction with respect to a recording medium, and droplets are discharged from the respective nozzles so that dot rows (raster lines) arrayed in the main scanning direction of the recording medium are formed. In the sub-scanning, the recording medium is moved (transported) in a sub-scanning direction that intersects with the main scanning direction. With this, dots are arrayed in the main scanning direction and the sub-scanning direction of the recording medium without spaces. In this manner, an image is formed on the recording medium.

With regard to such a recording device, for example, in JP-A-11-245384, the following recording device is disclosed. With the recording device, an image region formed by main scanning of a head and an image region formed by subsequent sub-scanning after the main scanning overlap each other in a boundary portion. In the boundary portion where the image regions overlap each other, a state in which printing (recording) is performed at a printing rate of 100% is shifted to a state in which printing is not performed at all toward nozzles at ends of the head. According to the recording device, even if the boundary portion changes due to a transport error during sub-scanning, sudden degradation of image quality can be prevented.

Incidentally, in some cases, the head has a tendency in which an amount of a discharged droplet per droplet fluctuates depending on a cycle for discharging droplets (in the following description, "amount of a discharged droplet" does not indicate a total amount of a plurality of droplets but indicates an amount of a discharged droplet per droplet). For example, in some cases, when discharge of droplets is performed intermittently in a long cycle, an amount of a discharged droplet tends to be reduced as compared to a case where discharge of droplets is successively performed a plurality of times in a short cycle. In the recording device described in JP-A-11-245384, a discharge cycle in an overlap region in which printing is performed with the main scanning before and after the sub-scanning in an overlapping manner reduces a nozzle usage ratio, and hence is longer as compared to a region in which printing is not performed in an overlapping manner. Thus, the amount of the discharged droplet in the overlap region is reduced, which may cause density unevenness.

As a countermeasure, in JP-A-2014-12374, there is described a printing device (recording device) including an allocation processing unit configured to allocate dots in the overlap region to be formed by any one of preceding main scanning and succeeding main scanning from a plurality of times of main scanning. The allocation processing unit performs allocation so that an array of the dots formed by the preceding main scanning and the succeeding main scanning easily form together as a group of a plurality of dots. With the printing device, an array of the dots formed by of the preceding main scanning and the succeeding main scanning easily gathers as the group of the plurality of dots. That is, the number of regions in which droplets are successively discharged in a short cycle is increased. Accordingly, a case where only one dot is formed independently is less liable to be caused. As a result, the amount of the discharged droplet in the overlap region is prevented from being reduced, and density unevenness is reduced.

However, with the printing device described in JP-A-2014-12374, depending on a method of gathering as the group of the plurality of dots, a region in which the droplets are excessively applied and a region in which application of the droplets is insufficient are adjacent to each other due to a transport error during the sub-scanning, which may degrade recording quality. Thus, there is a problem in that the recording quality is required to be further stabilized.

SUMMARY

A recording device according to the present disclosure includes a recording head including a first nozzle group and a second nozzle group in which a plurality of nozzles are arrayed in an alignment direction and a control unit, the recording device being configured to record a recording image including an overlap image recorded by the first nozzle group and the second nozzle group by discharging liquid while the recording head and a recording medium move relative to each other in a first direction that intersects with the alignment direction, and a non-overlap image recorded by the first nozzle group or the second nozzle group, wherein when the overlap image is recorded that includes a first dot group in which first dots are successively formed by the first nozzle group at a predetermined interval in the first direction, a second dot group in which second dots are successively formed by the second nozzle group at the predetermined interval in the first direction, and a third dot group including the first dots and the second dots, which are arrayed at an interval longer than the predetermined interval, the control unit arranges the first dot group and the second dot group at mutually exclusive positions, and arranges the third dot group at at least one of positions adjacent, in a second direction that intersects with the first direction, to the first dot group and the second dot group.

In the above-mentioned recording device, it is preferred that the control unit is configured to arrange, when the overlap image is recorded, the third dot group at positions on both sides adjacent, in the second direction, to the first group, which is not adjacent to the non-overlap image, and the second dot group, which is not adjacent to the non-overlap image.

In the above-mentioned recording device, it is preferred that the control unit is configured to arrange, when the overlap image is recorded, the third dot group at a boundary with the non-overlap image.

A recording device according to the present disclosure includes a recording unit including a first nozzle group in which a plurality of first nozzles are arrayed in an alignment direction and a second nozzle group in which a plurality of second nozzles are arrayed in the alignment direction, the recording unit being configured to record dots by discharging a droplet onto a recording medium while moving relatively in a first direction that intersects with the alignment direction, and a control unit, wherein the first nozzle group and the second nozzle group are provided so that positions of the plurality of first nozzles of the first nozzle group in an end region on one side in the alignment direction and positions of the plurality of second nozzles of the second nozzle group in an end region on the other side in the alignment direction overlap in a second direction that intersects with the first direction, the control unit is configured to control the recording unit to record, on the recording medium, a first pattern recorded by the plurality of first nozzles at positions not overlapping the plurality of second nozzles in the second direction, a second pattern recorded by the plurality of second nozzles at positions not overlapping the plurality of first nozzles in the second direction, and a third pattern recorded by the plurality of first nozzles and the plurality of second nozzles overlapping one another in the second direction, the third pattern is formed of a fourth pattern adjacent to the first pattern, a fifth pattern adjacent to the second pattern, and a sixth pattern sandwiched between the fourth pattern and the fifth pattern, the sixth pattern includes a first raster line and a second raster line, in the first raster line, a first dot group in which first dots are successively formed by the plurality of first nozzles in the first direction and a second dot group in which second dots are successively formed by the plurality of second nozzles in the first direction are alternately formed in the first direction, in the second raster line, the second dots adjacent to the first dots of the first raster line in the second direction and the first dots adjacent to the second dots of the first raster line in the second direction are formed in the second direction, and in the fourth pattern and the fifth pattern, the first dots and the second dots are alternately formed in the first direction.

A recording method according to the present disclosure is a recording method for recording a recording image by discharging liquid while a recording head including a first nozzle group and a second nozzle group in which a plurality of nozzles are arrayed in an alignment direction and a recording medium move relative to each other in a first direction that intersects with the alignment direction, the recording image including an overlap image recorded by the first nozzle group and the second nozzle group, and a non-overlap image recorded by the first nozzle group or the second nozzle group, the recording method including, when the overlap image is recorded that includes a first dot group in which first dots are successively formed by the first nozzle group at a predetermined interval in the first direction, a second dot group in which second dots are successively formed by the second nozzle group at the predetermined interval in the first direction, and a third dot group including the first dots and the second dots, which are arrayed at an interval longer than the predetermined interval, arranging the first dot group and the second dot group at mutually exclusive positions, and the third dot group at at least one of positions adjacent, in a second direction that intersects with the first direction, to the first dot group and the second dot group.

A recording method according to the present disclosure is a recording method for recording dots by discharging droplets onto a recording medium while a first nozzle group in which a plurality of first nozzles are arrayed in an alignment direction and a second nozzle group in which a plurality of second nozzles are arrayed in the alignment direction move relatively in a first direction that intersects with the alignment direction, the first nozzle group and the second nozzle group being provided so that positions of the plurality of first nozzles of the first nozzle group in an end region on one side in the alignment direction and positions of the plurality of second nozzles of the second nozzle group in an end region on the other side in the alignment direction overlap in a second direction that intersects with the first direction, the recording method including recording on the recording medium, a first pattern recorded by the plurality of first nozzles at positions not overlapping the plurality of second nozzles in the second direction, a second pattern recorded by the plurality of second nozzles at positions not overlapping the plurality of first nozzles in the second direction, and a third pattern recorded by the plurality of first nozzles and the plurality of second nozzles overlapping one another in the second direction, wherein the third pattern is formed of a forth pattern adjacent to the first pattern, a fifth pattern adjacent to the second pattern, and a sixth pattern sandwiched between the fourth pattern and the fifth pattern, the sixth pattern includes a first raster line and a second raster line, in the first raster line, a first dot group in which first dots are successively formed by the plurality of first nozzles in the first direction and a second dot group in which second dots are successively formed by the plurality of second nozzles in the first direction are alternately formed in the first direction, in the second raster line, the second dots adjacent to the first dots of the first raster line in the second direction and the first dots adjacent to the second dots of the first raster line in the second direction are formed in the second direction, and in the fourth pattern and the fifth pattern, the first dots and the second dots are alternately formed in the first direction.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
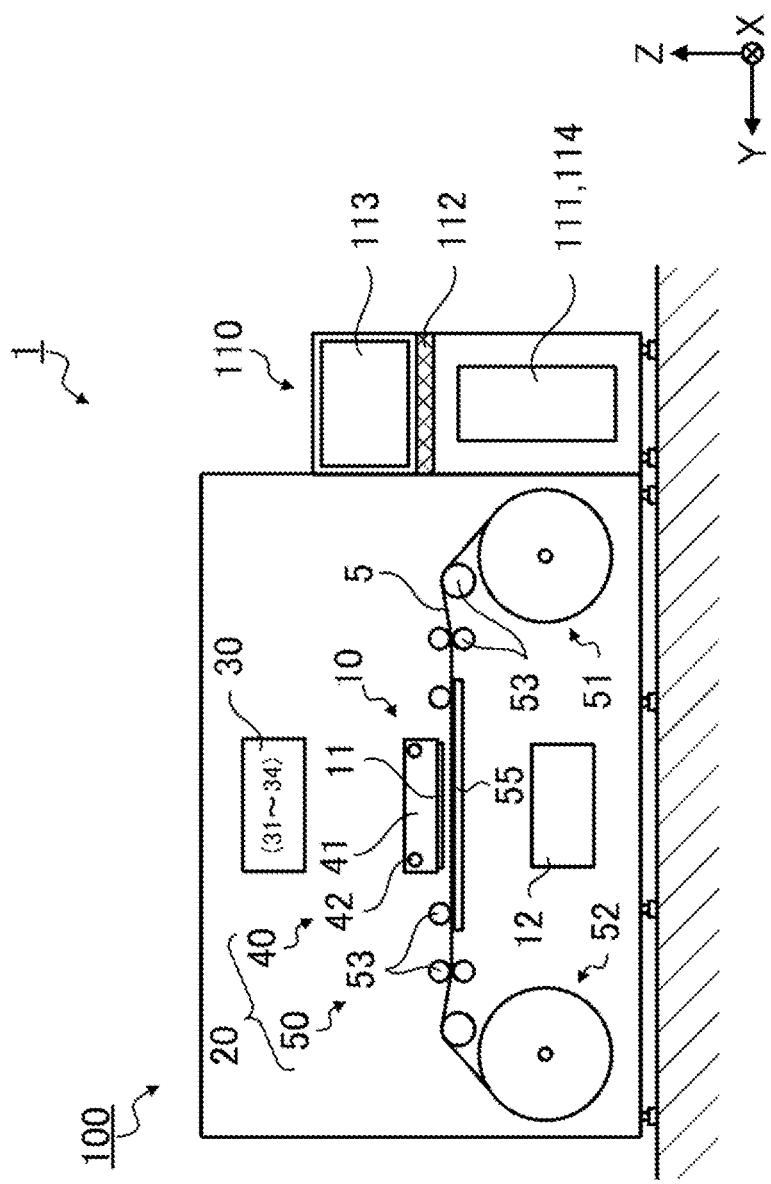
FIG. 1 is a front view illustrating a configuration of a recording device according to Exemplary Embodiment 1.

With reference to the drawings, description is given below of exemplary embodiments of the invention. The following is an exemplary embodiment of the invention and is not intended to limit the invention. Note that the respective drawings may be illustrated not-to-scale, for illustrative clarity. Also, as for coordinates given in the drawings, it is assumed that a Z-axis direction is an up/down direction, a +Z direction is an upward direction, an X-axis direction is a front/rear direction, a −X direction is a frontward direction, a Y-axis direction is a left/right direction, a +Y direction is a leftward direction, and an X-Y plane is a horizontal plane.

Exemplary Embodiment 1

Figure 2:
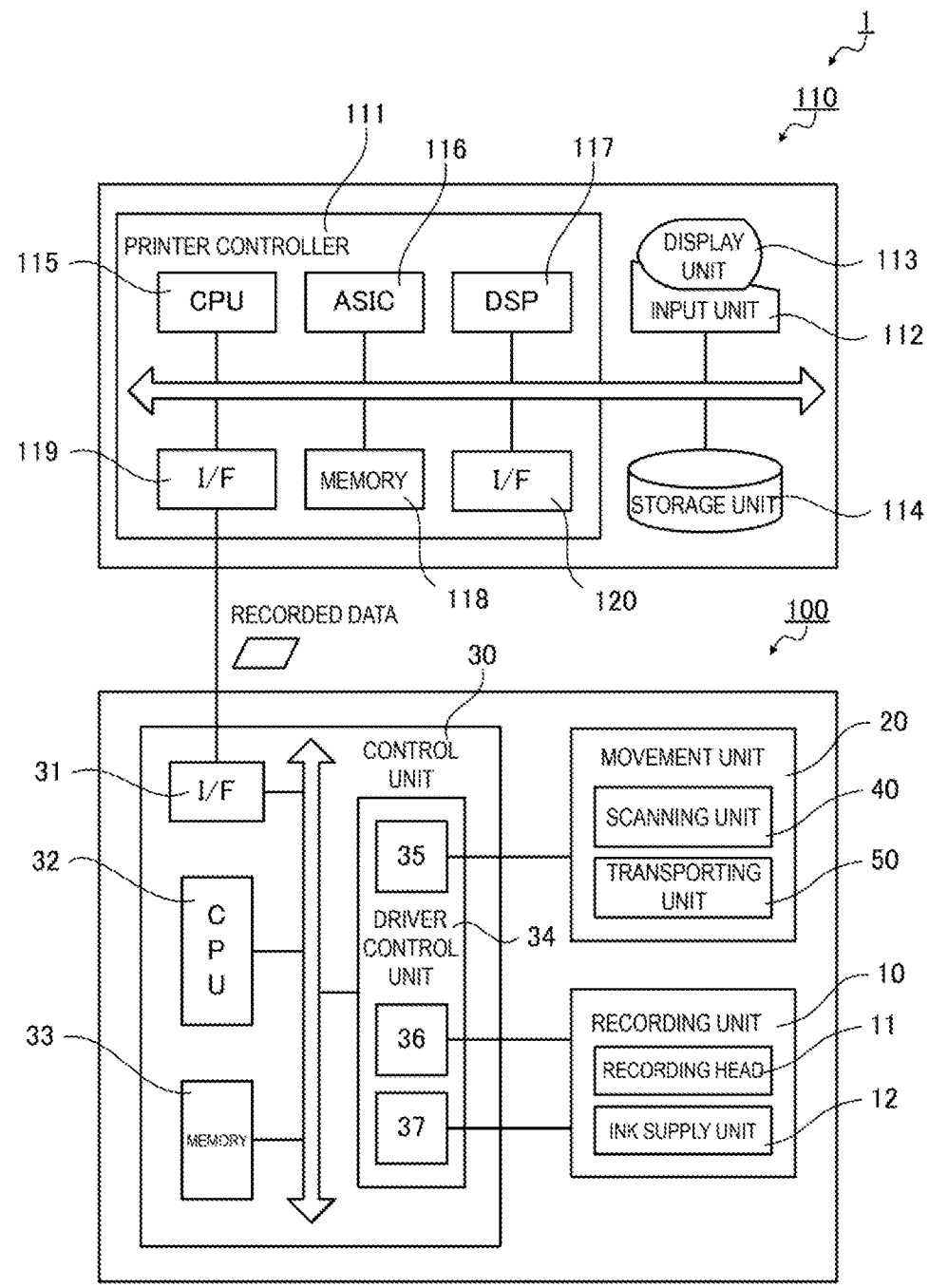
FIG. 2 is a block diagram illustrating the configuration of the recording device according to Exemplary Embodiment 1.

FIG. 1 is a front view illustrating a configuration of a recording system 1 as a "recording device" according to Exemplary Embodiment 1, and FIG. 2 is a block diagram of the same.

The recording system 1 includes a printer 100, and an image processor 110 connected to a printer 100. The printer 100 is an ink-jet-type serial printer that records a desired image (recording image) on a recording medium 5 having an elongated shape, which is fed in a state of being wound into a roll, based on recording data received from the image processor 110.

As the recording medium 5, for example, wood-free paper, cast paper, art paper, coat paper, and synthetic paper may be used. Further, the recording medium 5 is not limited to paper as described above, and a film formed of, for example, fibers, polyethylene terephthalate (PET), or polypropylene (PP) may be used.

Basic Configuration of Image Processor

The image processor 110 includes a printer controller 111 as a "control unit", an input unit 112, a display unit 113, a storage unit 114, and the like, and controls recording jobs to be recorded by the printer 100. As a preferred example, the image processor 110 is configured using a personal computer.

Software operated by the image processor 110 includes general image processing application software (hereinafter referred to as the "application") for handling image data to be recorded, and printer driver software (hereinafter referred to as the "printer driver") for controlling the printer 100 and for generating recording data to allow the printer 100 to execute recording.

Note that the printer driver is not limited to a configuration example as a functional unit using software but may also be configured using firmware, for example. The firmware is, for example, implemented on a System on Chip (SOC) in the image processor 110.

Here, the image data to be recorded is, for example data on an RGB color space, and includes, for example, text information and code information in addition to general full color image information obtained by a digital camera or the like.

The image processor 110 generates recording data for allowing the printer 100 to record a recording image based on the image data.

The recording data is image formation data obtained by converting the image data so that the printer 100 can record the recording data using the application and printer driver included in the image processor 110, and includes a command for controlling the printer 100.

The printer controller 111 includes a Central Processing Unit (CPU) 115, an Application Specific Integrated Circuit (ASIC) 116, a Digital Signal Processor (DSP) 117, a memory 118, a printer interface 119, a general purpose interface 120, and the like, and centrally controls the recording system 1 in its entirety.

The input unit 112 is an information input means serving as a user interface. Specifically, the input unit 112 is, for example, a port or the like for connecting a keyboard, a mouse pointer, or an information input device.

The display unit 113 is an information display means (display) serving as a user interface, and displays information input from the input unit 112, an image to be recorded by the printer 100, information about a recording job, and the like, based on the control of the printer controller 111.

The storage unit 114 is a rewritable storage medium such as a hard disk drive (HDD) or a memory card, and stores software run by the image processor 110 (programs run by the printer controller 111), an image to be recorded, information about a recording job, and the like.

The memory 118 is a storage medium that secures a region for storing programs run by the CPU 115, a work region for running such programs, and the like, and includes storage elements such as a RAM and an EEPROM.

The general purpose interface 120 is an interface capable of connecting external electronic devices, such as a Local Area Network (LAN) interface and a Universal Serial Bus (USB) interface.

Basic Configuration of Printer 100

The printer 100 includes a recording unit 10, a movement unit 20, a control unit 30, and the like. Upon reception of recording data from the image processor 110, the printer 100 controls the recording unit 10 and the movement unit 20 by the controller 30 and records an image (performs image formation) on the recording medium 5.

The recording unit 10 includes a recording head 11, an ink supply unit 12, and the like.

The movement unit 20 includes a main scanning unit 40, a transporting unit 50, and the like. The main scanning unit 40 includes a carriage 41, a guide shaft 42, a carriage motor (not illustrated), and the like. The transporting unit 50 includes a supply portion 51, a storage portion 52, transport rollers 53, a platen 55, and the like.

The recording head 11 includes a plurality of nozzles (nozzle rows) configured to discharge liquid for recording (hereinafter, referred to as ink) as droplets (hereinafter, referred to as ink droplets). The recording head 11 is mounted on the carriage 41, and moves back and forth in a main scanning direction (X-axis direction illustrated in FIG. 1) along with the carriage 41 that moves in the main scanning direction. The recording head 11 forms rows of dots (raster lines) in the main scanning direction on the recording medium 5 by discharging ink droplets onto the recording medium 5 supported by the platen 55 under the control of the controller 30 while moving in the main scanning direction.

Note that, the main scanning direction (X-axis direction illustrated in FIG. 1) is a "first direction" in this exemplary embodiment.

The ink supply unit 12 includes an ink tank, an ink supply channel (not illustrated) for supplying the ink to the recording head 11 from the ink tank, and the like.

Examples of the ink include a four color ink set obtained by adding black (K) to a three color ink set including cyan (C), magenta (M), and yellow (Y), as an ink set of dark ink compositions. Further, examples of the ink also include an eight color ink set obtained by adding an ink set of light ink compositions, such as light cyan (Lc), light magenta (Lm), light yellow (Ly), and light black (Lk), with reduced concentrations of the respective color materials. The ink tank, the ink supply channel, and an ink supply path to nozzles that discharge the same ink are provided separately for each ink.

As for a method of discharging ink droplets (ink-jet method), a piezo method is employed. The piezo method is a method of recording by using a piezoelectric element (piezo element) to apply a pressure corresponding to a recording information signal to the ink stored in a pressure chamber, and thus jetting (discharging) ink droplets from nozzles communicated with the pressure chamber.

Note that the technique of discharging ink droplets is not limited thereto and may be any other recording technique of discharging ink in a form of droplets and forming a dot group on a recording medium. Examples of such a method may include a method of recording by continuously jetting ink in the form of ink droplets from nozzles by use of an intense electric field between the nozzles and an accelerating electrode provided in front of the nozzles, and by sending a recording information signal from a deflecting electrode while the ink droplets are in flight; a method (electrostatic suction method) in which the ink droplets are jetted, without being deflected, according to the recording information signal; a method in which ink droplets are forcibly jetted by pressurizing ink with a small pump and mechanically vibrating the nozzles with a crystal oscillator or the like; a method (thermal jet method) for recording by heating and foaming ink with a microelectrode according to a recording information signal and thus jetting ink droplets; and the like.

The movement unit 20 (the main scanning unit 40 and the transporting unit 50) moves the recording medium 5 relative to the recording head 11 under the control of the controller 30.

The guide shaft 42 extends in the main scanning direction and supports the carriage 41 in a slidable contact state. The carriage motor serves as a drive source to move the carriage 41 back and forth along the guide shaft 42. That is, the main scanning unit 40 (the carriage 41, the guide shaft 42, and the carriage motor) moves the carriage 41 (that is, the recording head 11) in the main scanning direction along the guide shaft 42 under the control of the controller 30.

The supply unit 51 rotatably supports a reel on which the recording medium 5 is wounded into a roll, and feeds the recording medium 5 into the transport path. The storage portion 52 rotatably supports the reel that rolls up the recording medium 5, and rolls up the recorded recording medium 5 from the transport path.

The transporting rollers 53 include driving rollers for moving the recording medium 5 in a sub-scanning direction (Y-axis direction illustrated in FIG. 1) that intersects with the main scanning direction, driven rollers rotated along with the movement of the recording medium 5, and the like, and form the transport path along which the recording medium 5 is transported from the supply unit 51 to the storage portion 52 through a recording region (region in which the recording head 11 moves in the main scanning direction on an upper surface of the platen 55) of the recording unit 10.

Note that the sub-scanning direction (Y-axis direction illustrated in FIG. 1) is a "second direction" in this exemplary embodiment.

The controller 30 includes an interface 31, a CPU 32, a memory 33, a drive controller 34, and the like, and controls the printer 100.

The interface 31 is connected to the printer interface 119 of the image processor 110 to transmit and receive data between the image processor 110 and the printer 100. The image processor 110 and the printer 100 may be connected directly with a cable or the like, or indirectly through a network or the like. Alternatively, the interface 31 may transmit and receive data between the image processor 110 and the printer 100 through wireless communication.

The CPU 32 is an arithmetic processing unit for overall control of the printer 100.

The memory 33 is a storage medium that secures a region for storing programs run by the CPU 32, a work region for running such programs, and the like, and includes storage elements such as a RAM and an EEPROM.

The CPU 32 controls the recording unit 10 and the movement unit 20 through the drive controller 34 according to the program stored in the memory 33 and the recording data received from the image processor 110.

The drive control unit 34 controls driving of the recording unit 10 (recording head 11, and ink supply unit 12), and the movement unit 20 (main scanning unit 40, and transporting unit 50) based on the control of the CPU 32. The drive control unit 34 includes a movement control signal generation circuit 35, a discharge control signal generation circuit 36, and a drive signal generation circuit 37.

The movement control signal generating circuit 35 is a circuit that generates a signal for controlling the movement unit 20 (the main scanning unit 40 and the transporting unit 50) according to an instruction from the CPU 32.

The discharge control signal generating circuit 36 is a circuit that generates a head control signal for selecting nozzles that discharge ink, selecting a discharge amount, controlling the discharge timing, and the like according to an instruction from the CPU 32 based on the recording data.

The drive signal generating circuit 37 is a circuit that generates a basic drive signal including a drive signal that drives the piezoelectric elements of the recording head 11.

The drive controller 34 selectively drives the piezoelectric elements corresponding to the respective nozzles based on the head control signal and the basic drive signal.

With the above-mentioned configuration, the controller 30 forms (records) a recording image based on the image data on the recording medium 5 by repeating a pass operation and a sub-scanning operation (transport operation). In the pass operation, ink droplets are discharged (applied) from the recording head 11 onto the recording medium 5 supplied to the recording region by the transporting unit 50 (supply unit 51 and transport rollers 53) while the carriage 41, which supports the recording head 11 along the guide shaft 42, is caused to move in the main scanning direction (X-axis direction). In the sub-scanning operation, the recording medium 5 is caused to move in the sub-scanning direction (+Y direction) that intersects with the main scanning direction by the transporting unit 50 (transport rollers 53).

Basic Flow of Image Processing of Generating Recording Data

Figure 3:
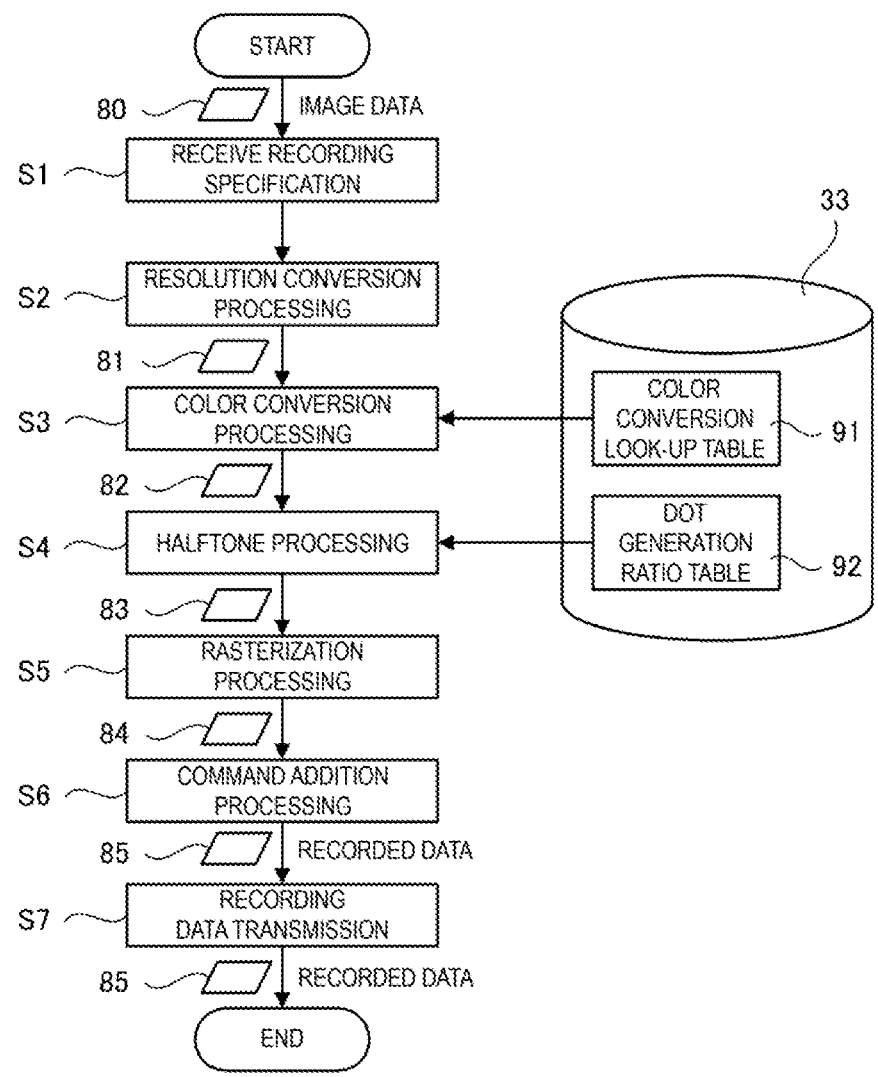
FIG. 3 is a flowchart illustrating a basic flow of processing for generating recording data.

FIG. 3 is a flowchart illustrating a basic flow of image processing for generating the recording data.

Recording on the recording medium 5 is started by transmitting the recording data to the printer 100 from the image processor 110. The recording data is generated by the printer driver.

For the conversion of the image data from the application into the recording data, the printer driver performs resolution conversion processing, color conversion processing, halftone processing, rasterization processing, command addition processing, and the like.

With reference to FIG. 3, description is given below of the basic flow of the recording data generation.

First, at the time of implementing the recording, the printer driver acquires image data 80 as print target according to designation of the user, and receives recording specifications (recording medium recording size, recording mode, and the like) from the user (step S1).

Here, with the recording mode, the recording corresponding to each selection is executed in a case where, for example, a recording specification such as "fine", "high definition", "fast" can be selected by the user at the time of recording. Recording modes in which the relative movement amounts of the sub scanning operations are different according to the respective selections (that is, the number of pass operations for forming an image is different), correspond to each selection.

Next, the printer driver performs the resolution conversion processing on the image data 80 (step S2).

The resolution conversion processing is processing for converting the image data 80 output from the application into a resolution for recording (recording resolution) on the recording medium 5. For example, when the recording resolution is specified as 720×720 dpi, vector format image data 80 received from the application is converted into bit map format image data 81 having a 720×720 dpi resolution. Each pixel data in the image data 81 after the resolution conversion processing includes pixels arranged in a matrix pattern. Each pixel has a tone value in 256 tones in, for example, the RGB color space. That is, each piece of the pixel data after the resolution conversion shows the tone value of the corresponding pixel.

Among the pixels arranged in the matrix pattern, the pixel data corresponding to one row of pixels aligned in a predetermined direction is called raster data. Note that the predetermined direction in which the pixels corresponding to the raster data are aligned corresponds to the direction (main scanning direction) in which the recording head 11 moves when recording an image.

Next, the printer driver performs the color conversion processing of the image data 81 (step S3).

The color conversion processing is processing for converting RGB data into data of a CMYK color space. CMYK colors refer to cyan (C), magenta (M), yellow (Y), and black (K), respectively. The image data of the CMYK color space is data corresponding to the colors of the ink of the printer 100. Therefore, when the printer 100 uses ten types of ink of the CMYK color system, the printer driver generates image data in a ten-dimensional space of the CMYK color system based on the RGB data. This color conversion processing is performed based on a color conversion look-up table 91 serving as a "color conversion table" in which the tone values of the RGB data and the tone values of the CMYK color system data are associated with each other. Note that the pixel data after the color conversion processing is the CMYK color system data of 256 tones expressed in, for example, the CMYK color space. Through the color conversion processing, the image data 82 in the CMYK color space is generated from the image data 81 in the RGB color space.

The color conversion look-up table 91 is generated for each individual printer 100 in a factory, and is stored as initial data in the memory 33 (for example, a non-volatile storage medium such as EEPROM) at the time of shipment of the printer 100. The printer driver performs the color conversion processing by reading the color conversion look-up table 91 from the printer 100 at the time of generating the recording data.

Next, the printer driver performs the halftone processing on the image data 82 (step S4).

The halftone processing is processing for converting data of high tones (256 tones) into data of a number of tones that can be formed by the printer 100. Through this halftone processing, data expressing 256 tones is converted into, for example, 1-bit data expressing two tones (dot and no dot) and 2-bit data expressing four tones (no dot, small dot, medium dot, and large dot). Specifically, a dot generation rate corresponding to the tone value (in the case of four tones, a generation rate for each of no dot, small dot, medium dot, and large dot, for example) is obtained from a dot generation rate table 92 in which the tone values (0 to 255) and dot generation rates are associated with each other. Then, with the generation rate thus obtained, pixel data (image data 83) is created so that dots are formed in a distributed manner, by using a dither method, an error diffusion method, or the like.

The dot generation ratio table 92 is generated for each individual printer 100 in a factory, and is stored as initial data in the memory 33 (for example, a non-volatile storage medium such as EEPROM) at the time of shipment of the printer 100. The printer driver performs the halftone processing by reading the dot generation ratio table 92 from the printer 100 at the time of generating the recording data.

Next, the printer driver performs the rasterization processing on the image data 83 (step S5).

The rasterization processing is processing for rearranging the pixel data (for example, the 1-bit or 2-bit data as described above) in the matrix pattern, according to a dot formation order for recording. The rasterization processing includes allocation processing of allocating the image data 83 including the pixel data after the halftone processing to each pass operation in which the recording head 11 (nozzle rows) discharges ink droplets while moving in the main scanning direction. Once the allocation processing is completed, the pixel data in the matrix pattern is turned into the data (image data 84) allocated to actual nozzles that form respective raster lines constituting the recording image.

Next, the printer driver performs command addition processing on the image data 84 (step S6).

The command addition processing is processing for adding command data corresponding to a recording method, to the rasterized data. The command data includes, for example, transporting data related to transporting specifications (a moving amount in the sub-scanning direction, a speed, and the like) of the recording medium 5.

Through the command addition processing, the recording data 85 for causing the printer 100 to perform recording is generated, and the generated recording data 85 is transmitted to the printer 100 to start recording (step S7).

Such processing by the printer driver is performed by the ASIC 116 and the DSP 117 (refer to FIG. 2) under the control of the CPU 115. Then, the generated recording data is transmitted through recording data transmission processing to the printer 100 through the printer interface 119.

Nozzle Rows

Figure 4:
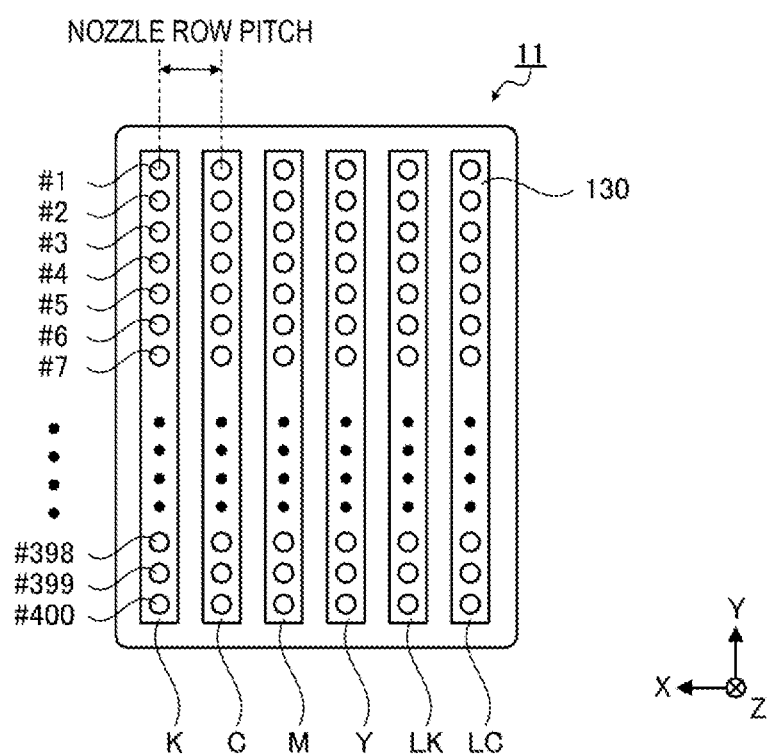
FIG. 4 is a schematic view illustrating an example of arrangement of nozzles when viewed from a lower surface of a recording head.

FIG. 4 is a schematic view illustrating an example of arrangement of nozzles when viewed from a lower surface of the recording head 11.

As illustrated in FIG. 4, the recording head 11 includes nozzle rows 130 in which a plurality of nozzles for discharging ink of each color are arranged in lines (in the example illustrated in FIG. 4, a black ink nozzle row K, a cyan ink nozzle row C, a magenta ink nozzle row M, a yellow ink nozzle row Y, a gray ink nozzle row LK, and a light cyan ink nozzle row LC each including 400 nozzles #1 to #400).

The plurality of nozzles of each of the nozzle rows 130 are aligned and lined up at a constant interval (nozzle pitch) along an "alignment direction". Here, the "alignment direction" is the same direction as the sub-scanning direction (Y-axis direction). Further, the plurality of nozzle rows 130 are aligned and lined up to be parallel to each other at a constant interval (nozzle row pitch) along a direction (X-axis direction) intersecting with the sub scanning direction. In FIG. 4, the nozzles of each of the nozzle rows 130 are assigned a smaller number than the nozzle arranged on the downstream side (#1 to #400). That is, the nozzle #1 is located on the downstream side of the nozzle #400 in the sub scanning direction. Each of the nozzles is provided with a driving element (piezoelectric element such as a piezo element described above) for driving each of the nozzles to discharge ink droplets.

Note that, in this exemplary embodiment, the "alignment direction" is the same direction as the sub-scanning direction (Y-axis direction). However, the "alignment direction" is not necessarily required to be the same direction as the sub-scanning direction (Y-axis direction). For example, the "alignment direction" may be a direction slightly inclined with respect to the sub-scanning direction (Y-axis direction). Timing for discharging ink droplets from the respective nozzles is controlled. Accordingly, a recording image which the inclination does not affect can be recorded.

Suppression of Banding in the Related Art

Figure 5:
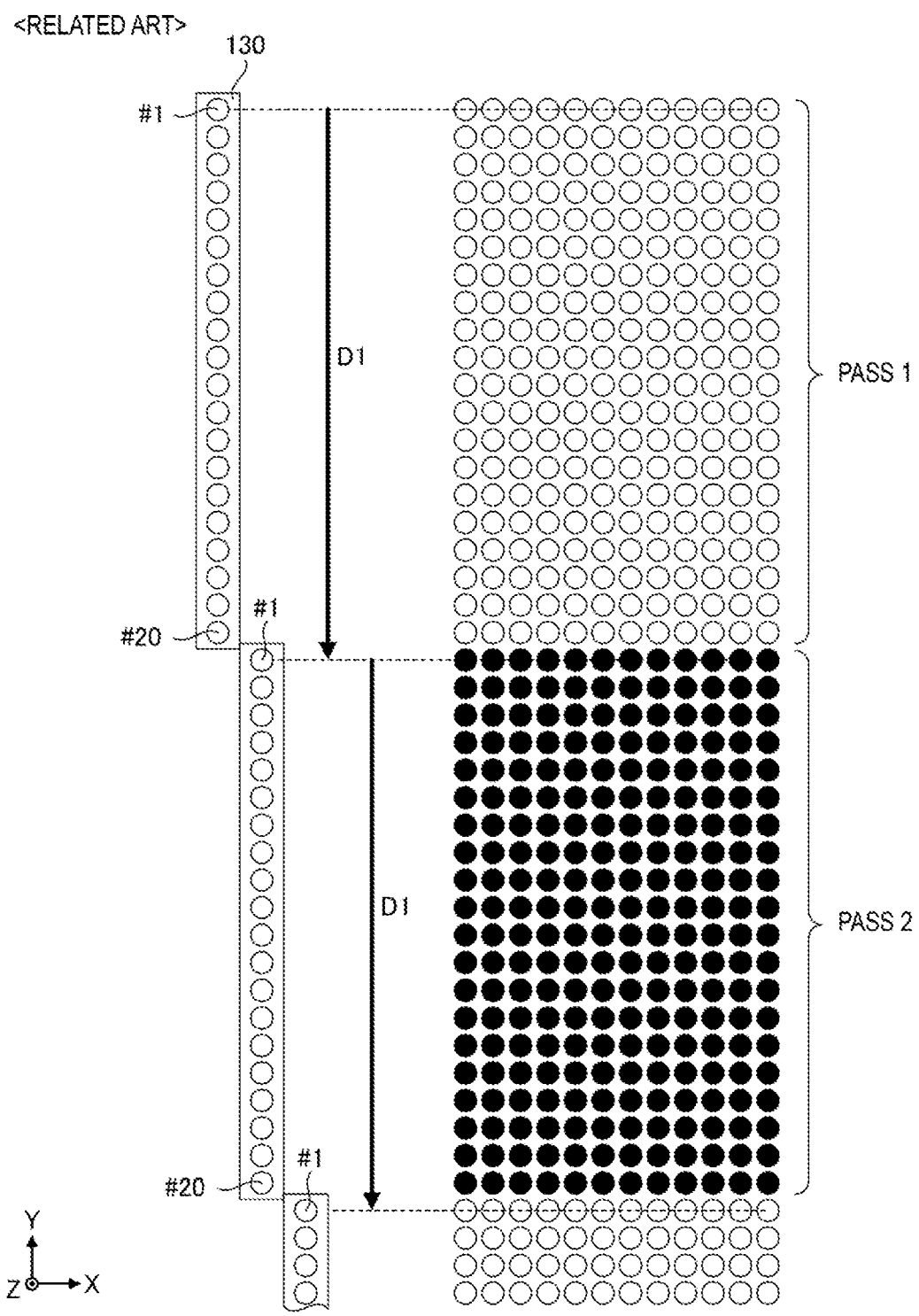
FIG. 5 is an explanatory view illustrating an example of band recording in the related art.

FIG. 5 is an explanatory view illustrating an example of band recording in the related art and illustrating a positional relationship between relative positions of the nozzle rows 130, which form the recording head 11 along with the movement of the recording medium 5 in the sub-scanning direction (+Y direction), and dots formed by the pass operations. Note that, for easy understanding of the description, a case where each of the nozzle rows 130 illustrated in FIG. 5 includes twenty nozzles (number of nozzles n=20). Further, D1 illustrated in FIG. 5 is a sub-scanning feeding amount being a transport amount between the pass operations.

In FIG. 5, the relative positions of the nozzle rows 130 along with a step movement of the recording medium 5 for each sub-scanning feeding amount D1 by the transporting unit 50 are illustrated in a diagonally shifted manner so as not to overlap the nozzle rows 130. That is, in FIG. 5, the nozzle rows 130 seem to move in the −Y direction. In actuality, the recording medium 5 moves in the +Y direction. Further, the positional relationship of the nozzle rows 130 in the X-axis direction is not relevant.

Note that, in the following description, one pass operation forming dots by discharging ink from the nozzle rows 130 while moving in the main scanning direction (hereinafter, simply referred to as a pass in some cases) indicates dot formation along with one movement in the main scanning direction. A partial image recorded by dot formation along with one movement in the main scanning direction is combined in the Y-axis direction. Accordingly, the recording image based on the image data is recorded.

Further, in this exemplary embodiment, a "first nozzle group" and a "second nozzle group" described later correspond to the nozzle row 130. The nozzle row 130 performing a preceding pass operation is the first nozzle group, and the nozzle row 130 performing the succeeding pass operation is the second nozzle group. That is, in the following description, the nozzles included in the nozzle row 130 corresponding to the first nozzle group are "first nozzles", and dots formed by the first nozzles are "first dots". Further, the nozzles included in the nozzle row 130 corresponding to the second nozzle group are "second nozzles", and dots formed by the second nozzles are "second dots".

As illustrated in FIG. 5, in a case where the sub-scanning feeding amount D1 is a width of the partial image formed by one pass operation (length in the Y-axis direction), when the nozzle rows 130 perform sub-scanning by the sub-scanning feeding amount D1 for each single pass operation, the partial image recorded by the pass operation does not overlap. Thus, efficient recording can be performed. However, with this method, due to feeding accuracy of the recording medium 5 in the Y-axis direction or impact position deviation of ink droplets discharged from the nozzles between bands (between partial images), at the boundary of the bands (partial images), a white streak (light-colored streak), formed by a large interval between dots, or a black streak (dark-colored streak), formed by a small interval between dots, may be caused in some cases.

Figure 6:
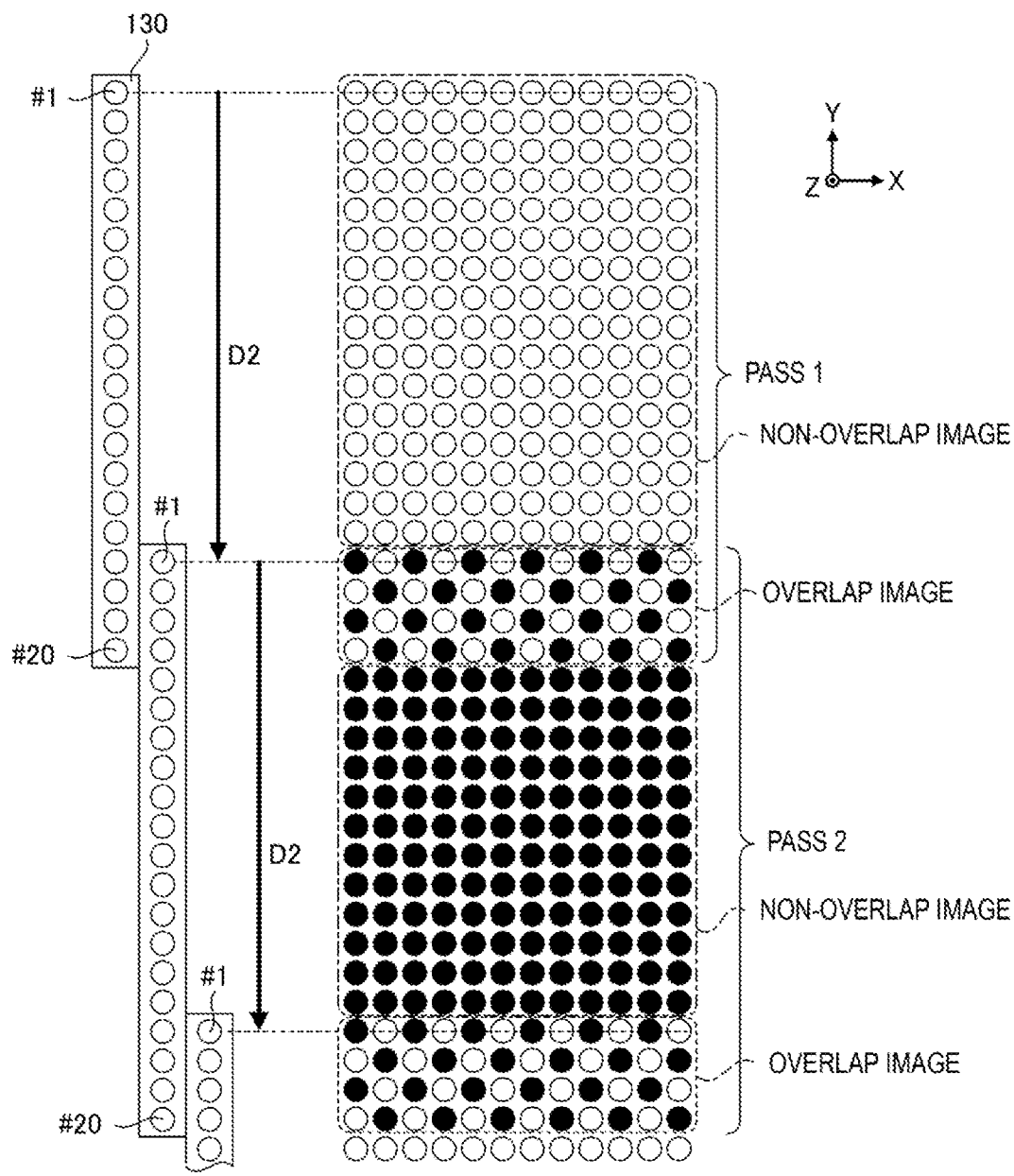
FIG. 6 is an explanatory view illustrating a recording method of overlapping parts of regions near a band boundary.

In order to suppress banding caused by such light-colored or dark-colored streaks, a recording method in which partial regions near the band boundary are allocated to the respective band recording (pass operations) and recorded in an overlapping manner is known (partial overlap (POL) recording). FIG. 6 is an explanatory view illustrating an example of this method. The dots formed by a pass 1 (and pass 3) are indicated by white circles, and the dots formed by a pass 2 are indicated by black circles.

In the example illustrated in FIG. 6, a sub-scanning feeding amount D2 is set to be smaller than the sub-scanning feeding amount D1 by four dot-rows, and the partial images formed by the respective pass operations overlap each other in the four dot rows. In a joint region in which the partial images formed by the respective pass operations overlap each other (hereinafter, also referred to as an overlap image region), as illustrated in FIG. 6, the dots to be formed are arranged at every other dot alternately, and are allocated to the respective pass operations. That is, in the overlap image region, an allocation ratio of formation positions of dots allocated to the first nozzle group and an allocation ratio of formation positions of dots allocated to the second nozzle group are each set to 50%, and dots based on the recording data are formed at dot formation positions with the allocation ratio of 100% by the pass operations of two times.

Note that an image of the overlap image region is an "overlap image" in this exemplary embodiment. Further, in this exemplary embodiment, the image region recorded by (only) the first nozzle group or (only) the second nozzle group is a non-overlap image region. An image of the non-overlap image region is a "non-overlap image" in this exemplary embodiment.

With this method, the boundary of the band becomes a blur, and hence banding caused by the above-mentioned light-colored and dark-colored streaks can be suppressed.

However, the recording head 11 has a tendency in which an amount of a discharged ink droplet per ink droplet fluctuates depending on a cycle for discharging ink droplets (in the following description, "amount of a discharged ink droplet" indicates an amount of a discharged ink droplet per droplet).

Figure 7:
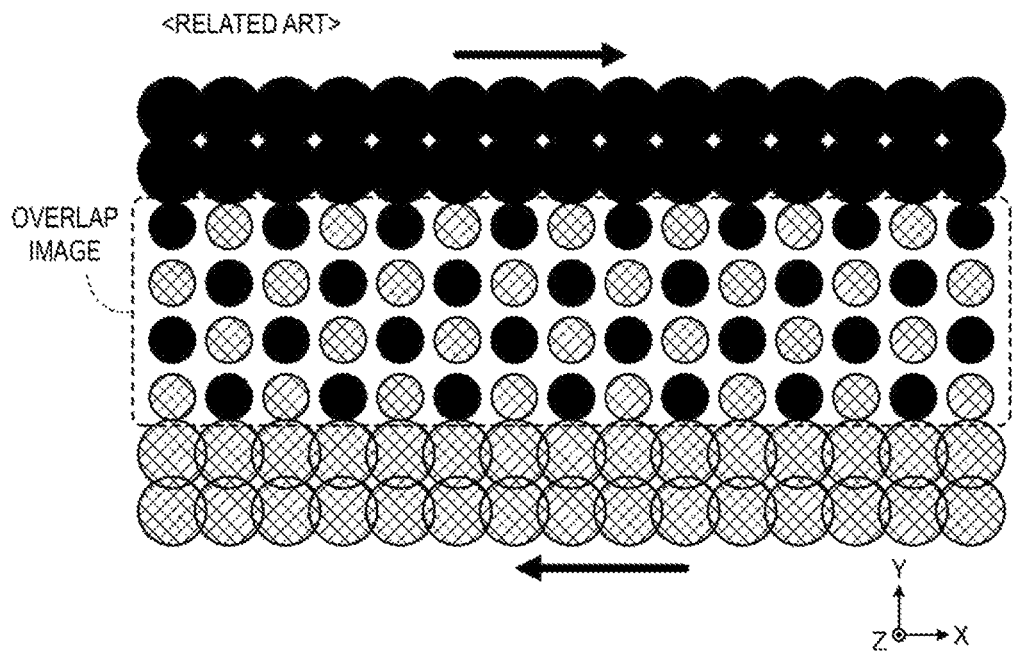
FIG. 7 is a schematic view illustrating an example in a case where a discharge cycle of ink droplets is multiplied and a diameter of a dot to be formed is reduced.

FIG. 7 is a schematic view illustrating an example in a case where a discharge cycle of ink droplets is multiplied and a diameter of a dot to be formed is reduced.

FIG. 7 is a solid recording image (image with a dot filling ratio of 100% in a dot matrix). The dots indicated with black circles are dots formed under a state in which ink droplets are discharged during the main scanning movement from the left side to the right side in FIG. 7 (dots formed by the first nozzle group). The dots indicated with shaded circles are dots formed under a state in which ink droplets are discharged during the main scanning movement from the right side to the left side in FIG. 7 (dots formed by the second nozzle group).

The uppermost two rows of the dot rows and the lower most two rows of the dot rows are dots forming the non-overlap image, and are formed with ink droplets discharged successively at a predetermined pitch. Thus, the amount of the discharged ink droplet is relatively large. In contrast, the center four rows of the dot rows are dots forming the overlap image, and are formed with ink droplets intermittently discharged at a pitch obtained by multiplying the predetermined pitch. Thus, the ink droplets are discharged in a multiplied cycle, and hence the amount of the discharged ink droplet is relatively small. Therefore, the amount of the ink droplet discharged in the overlap region is reduced, which may cause density unevenness.

Suppression of Density Unevenness in the Related Art

As a countermeasure, in order to prevent the amount of the ink droplet discharged in the overlap region from being reduced, a method of shortening a discharge cycle of the ink droplets in the overlap region is adopted. Specifically, the ink droplets are not discharged intermittently to an entire surface of the overlap region, but are successively discharged in a collective manner to some extent. In this manner, the dots to be formed are prevented from being reduced in size. That is, the region in which the ink droplets are successively discharged in a collective manner to some extent is increased, and thus, a size of each of the dots formed throughout the entire overlap region is prevented from being reduced.

Note that, even in the case of the ink droplets forming the non-overlap image (ink droplets discharged successively at the predetermined pitch), all ink droplets do not necessarily have an amount larger than that of the ink droplets forming the overlap image (ink droplets discharged intermittently at a pitch longer than the predetermined pitch). For example, in some cases, the amount of the ink droplet discharged by the first pass operation (the amount of the ink droplet discharged firstly in the case of successive discharge at the predetermined pitch) may substantially be equal to the amount of the ink droplet forming the overlap image (the amount of the ink droplet discharged intermittently at a pitch longer than the predetermined pitch). In FIG. 7 and the drawings after FIG. 7, for easy understanding of the description, dots, which include dots forming the non-overlap image, in the region in which the amount of the discharged ink droplet becomes larger (region in which the ink droplets are discharged successively at the predetermined pitch) are illustrated to have a uniform large size.

Figure 8:
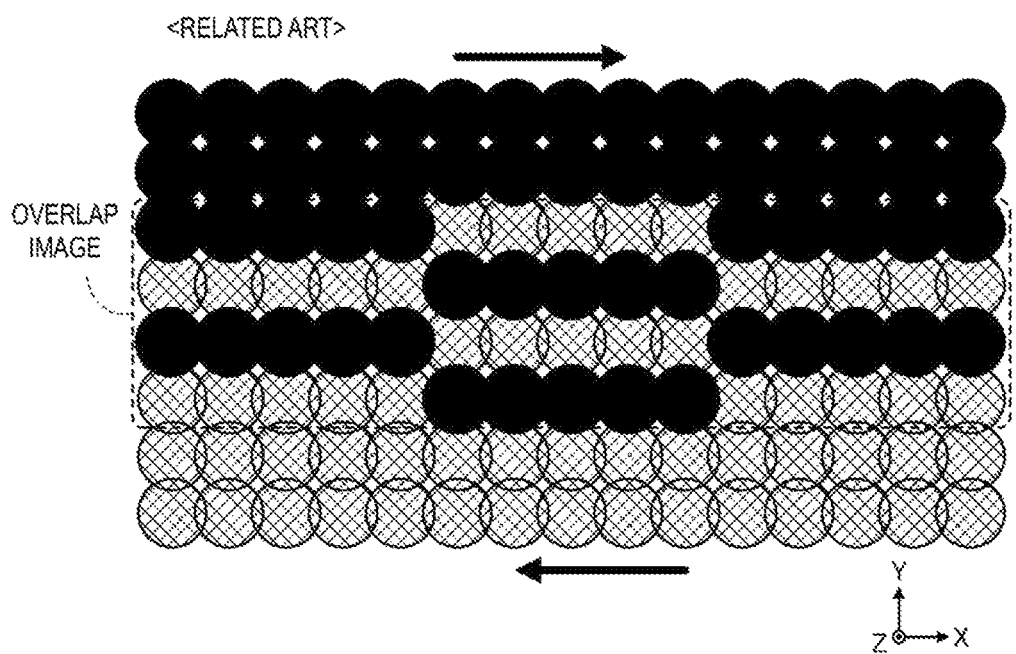
FIG. 8 is a schematic view illustrating a related-art example in a case where an overlap image is formed with five successive dots.

FIG. 8 is a schematic view illustrating, as the example of the successive discharge in a collective manner to some extent, a related-art example in a case where the overlap image is formed with groups including five successive dots.

As illustrated in FIG. 8, the overlap image is recorded by alternately arranging five successive dots formed by the first nozzle group and five successive dots formed by the second nozzle group. In this manner, density of the overlap image is prevented from being light (thin).

However, in the case where the dots formed by the first nozzle group and the second nozzle group are formed as the above-mentioned groups of dots, a region in which the ink droplets are excessively applied and a region in which application of the ink droplets is insufficient are adjacent to each other due to a movement error (transport error) of the sub-scanning operation, which may degrade recording quality. Thus, there is a problem in that the recording quality is required to be further stabilized.

Figure 9:
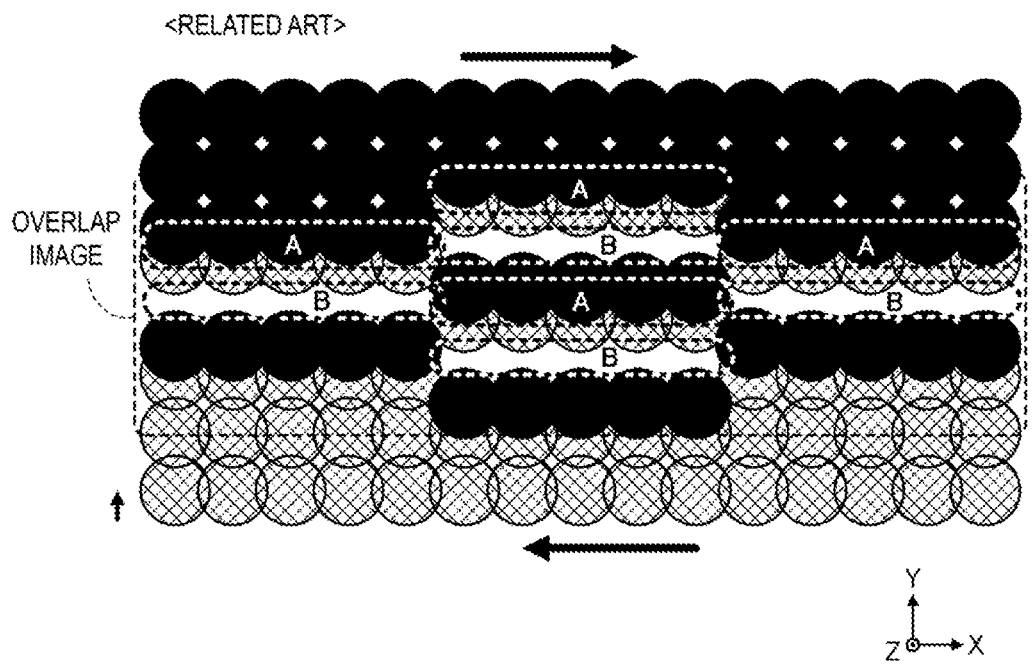
FIG. 9 is a view illustrating a related-art recording image in a case where dots formed by a second nozzle group are deviated by a half pitch in a +Y direction due to a movement error of a sub-scanning operation.

FIG. 9 illustrates a recording image being the recording image illustrated in FIG. 8 in which the recording medium 5 is deviated in the −Y direction by a half dot pitch in the sub-scanning direction (that is, the dots (shaded dots) formed by the second nozzle group are deviated by a half pitch in the +Y direction) due to a movement error of the sub-scanning operation.

Figure 10:
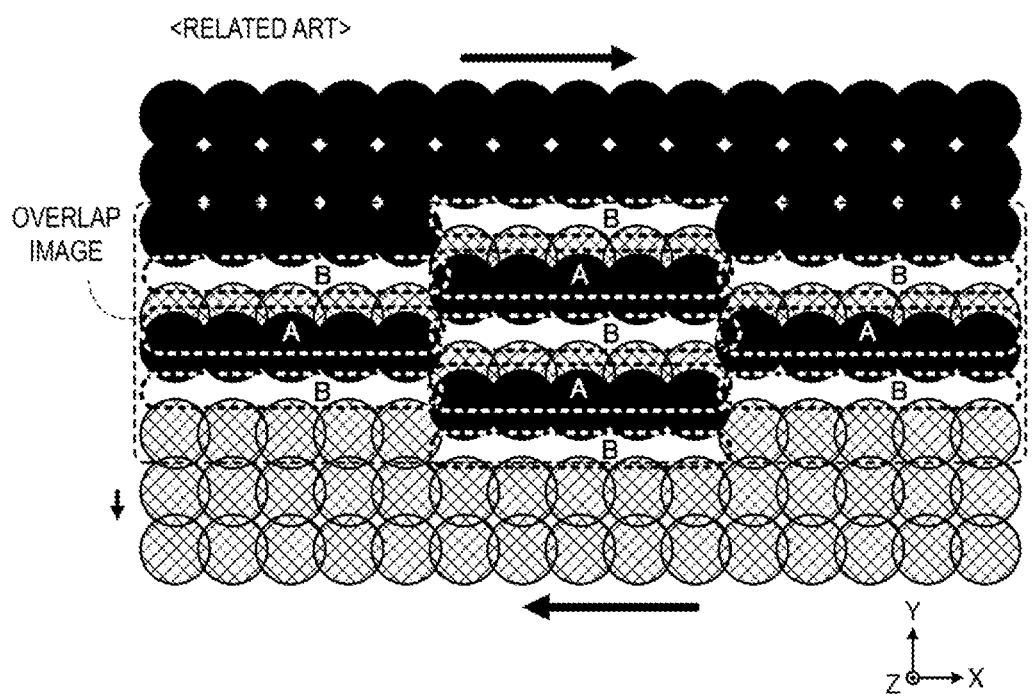
FIG. 10 is a view illustrating a related-art recording image in a case where dots formed by the second nozzle group are deviated by a half pitch in a −Y direction due to a movement error of the sub-scanning operation.

Further, in contrast to FIG. 9, FIG. 10 illustrates a recording image being the recording image illustrated in FIG. 8 in which the recording medium 5 is deviated in the +Y direction by a half dot pitch in the sub-scanning direction (that is, the dots (shaded dots) formed by the second nozzle group are deviated by a half pitch in the −Y direction) due to the movement error of the sub-scanning operation.

As apparent from FIG. 9 and FIG. 10, due to the movement error of the sub-scanning operation, the regions formed by the five collective dots overlap each other. Accordingly, large dots gather excessively. As a result, in the recording image, the recording image in which regions A in which the supplied ink amount is excessive and regions B in which dots are not formed in an area where the dots are to be formed and the applied ink amount is not sufficient are adjacent to each other in the upper and lower directions and the right and left directions (X-axis direction and Y-axis direction). In this case, the overlap image is visually recognized as banding which gives a feeling that something is wrong with respect to the non-overlap image.

Suppression of Density Unevenness in This Exemplary Embodiment

In view of the above, in the recording device according to this exemplary embodiment, at the time of recording the overlap image, the printer controller 111 performs recording so as to include a first dot group, a second dot group, and a third dot group in the overlap image. In the first dot group, the first dots are successively formed at a predetermined interval in the first direction by the first nozzle group. In the second dot group, the second dots are successively formed at the predetermined interval in the first direction by the second nozzle group. The third dot group includes the first dots and the second dots arrayed at an interval larger than the predetermined interval. The first dot group and the second dot group are arranged at mutually exclusive positions, and the third dot group is arranged at at least one of the positions adjacent, in the second direction that intersects with the first direction, to the first dot group and the second dot group.

As the recording method according to this exemplary embodiment, at the time of recording the overlap image, the overlap image is recorded so as to include the first dot group, the second dot group, and the third dot group in the overlap image. In the first dot group, the first dots are successively formed at the predetermined interval in the first direction by the first nozzle group. In the second dot group, the second dots are successively formed at the predetermined interval in the first direction by the second nozzle group. The third dot group includes the first dots and the second dots arrayed at an interval larger than the predetermined interval. The first dot group and the second dot group are arranged at mutually exclusive positions, and the third dot group is arranged at at least one of the positions adjacent, in the second direction that intersects with the first direction, to the first dot group and the second dot group.

Details will be described below.

EXAMPLE 1

Figure 11:
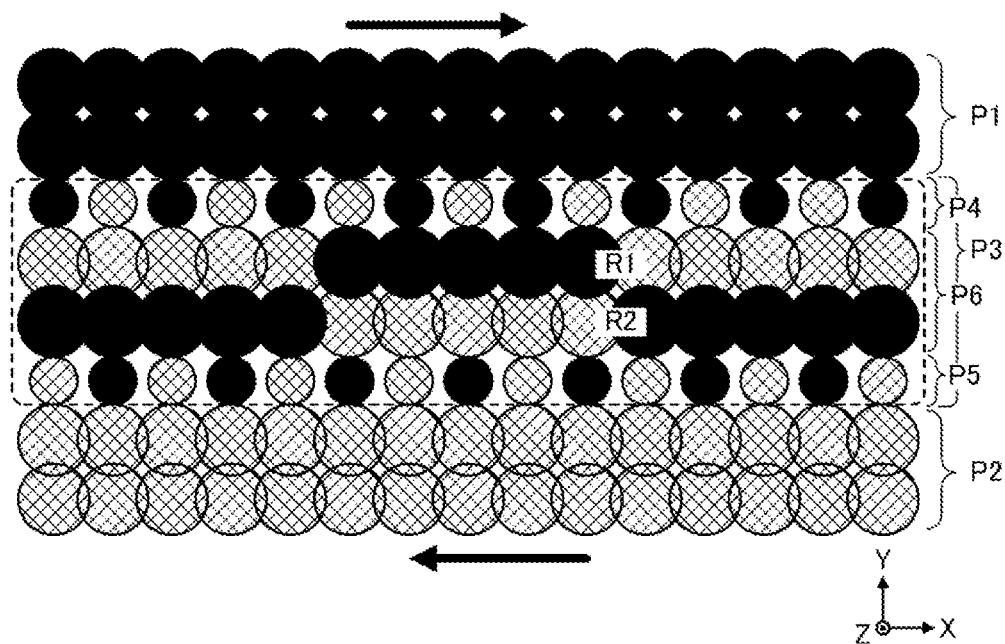
FIG. 11 is a schematic view illustrating a recording image in Example 1 in this exemplary embodiment.

FIG. 11 is a schematic view illustrating a recording image in Example 1 in this exemplary embodiment.

FIG. 11 is a solid recording image (image with a dot filling ratio of 100% in a dot matrix). The black circles in FIG. 11 are the first dots formed by the first nozzles. That is, the black circles are the dots formed by the nozzle row 130 (the first nozzle group) performing the preceding pass operation. Further, the shaded circles are the second dots formed by the second nozzles. That is, the shaded circles are the dots formed by the nozzle row 130 (the second nozzle group) performing the successive pass operation.

The printer controller 111 controls the recording unit 10 so that the recording image recorded on the recording medium 5 is formed of a first pattern P1 recorded by (only) the first nozzles, a second pattern P2 recorded by (only) the second nozzles, and a third pattern P3 recorded by the first nozzles and the second nozzles. That is, the recording image is recorded by the first pattern P1 and the second pattern P2, which are non-overlap images, and the third pattern P3 being an overlap image.

Here, the third pattern P3 being an overlap image region is formed of a fourth pattern P4 held in contact with the first pattern P1, a fifth pattern P5 held in contact with the second pattern P2, and a sixth pattern P6 sandwiched between the fourth pattern P4 and the fifth pattern P5.

The sixth pattern P6 is a pattern formed of a first raster line R1 and a second raster line R2.

In the first raster line R1, the first dot group and the second dot group are alternately formed in the main scanning direction. In the first dot group, five first dots are successively formed in the main scanning direction (X-axis direction) by the first nozzles. In the second dog group, five second dots are successively formed in the main scanning direction (X-axis direction) by the second nozzles.

In the second raster line R2, the second dots, which are adjacent to the first dots of the first raster line R1 in the sub-scanning direction (Y-axis direction) (adjacent in the −Y direction), and the first dots adjacent to the second dots of the first raster line R1 in the sub-scanning direction (adjacent in the −Y direction), are formed in the sub-scanning direction.

That is, in the sixth pattern P6, the first dot group and the second dot group are arranged at mutually exclusive positions. Note that there is no difference even in a case where the first raster line R1 and the second raster line R2 are arranged at reverse positions in the Y-axis direction in the sixth pattern P6.

Each of the fourth pattern P4 and the fifth pattern P5 is a pattern in which the first dots and the second dots are alternately formed in the main scanning direction. That is, each of the fourth pattern P4 and the fifth pattern P5 is the "third dot group" including the first dots and the second dots, which are arrayed at the interval larger than the predetermined interval.

Here, the "predetermined interval" indicates a dot pitch in the main scanning direction (X-axis direction) in a solid recording image (image with a dot filling ratio of 100% in a dot matrix). That is, in the third dot group in which the first dots and the second dots are alternately formed, the dots are arrayed at the interval larger than the predetermined interval (interval twice as large as the predetermined interval).

That is, the printer controller 111 arranges the third dot group at the boundary with the non-overlap image at the time of recording the overlap image.

As described above, the printer controller 111 allocates discharge of ink droplets to the respective nozzles at the respective timing so that the recording image is recorded with the above-mentioned patterns (the first pattern P1 to the sixth pattern P6), based on the image data 83 (pixel data in the matrix pattern), which is generated by the halftone processing, in the rasterization processing in the flow for generating the recording data described with reference to FIG. 3. In this manner, the image data 84 (refer to FIG. 3) is generated. Further, in the subsequent processing, the printer controller 111 generates recording data 85, based on the image data 84 generated as described above, and causes the printer 100 to perform recording. A series of the recording method performed based on the recording data 85 generated by the printer controller 111 is none other than the recoding method according to this exemplary embodiment.

Figure 12:
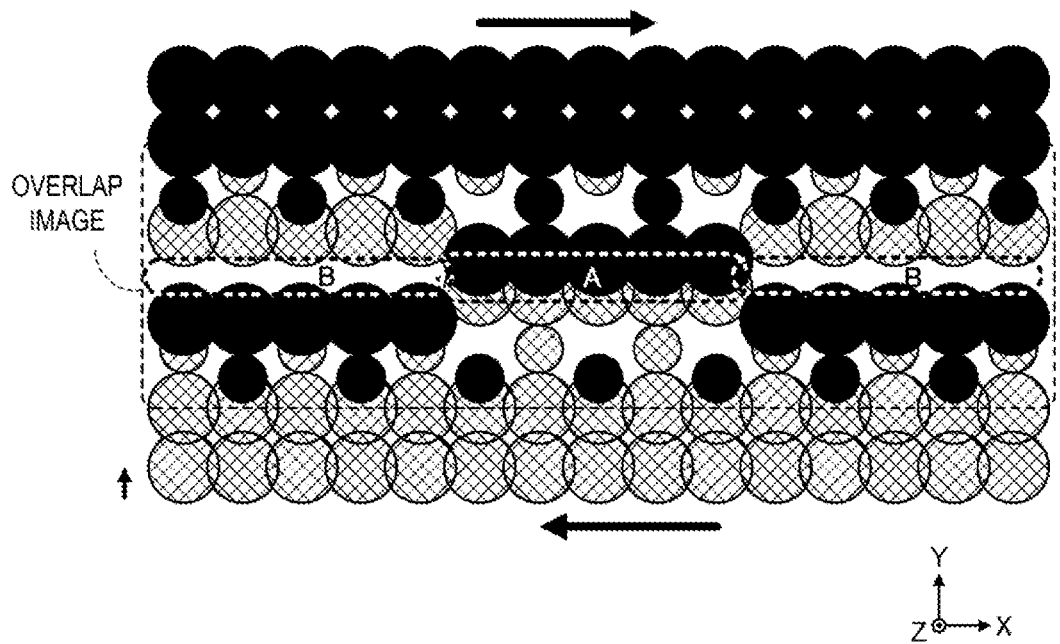
FIG. 12 illustrates a recording image in Example 1 in a case where dots formed by a second nozzle group are deviated by a half pitch in a +Y direction due to a movement error of a sub-scanning operation.

FIG. 12 illustrates a recording image in Example 1 in a case where the dots formed by the second nozzle group are deviated by a half pitch in the +Y direction due to a movement error of the sub-scanning operation. Further, FIG. 13 is a recording image in Example 1 in a case where the dots formed by the second nozzle group are deviated by a half pitch in the −Y direction due to the movement error of the sub-scanning operation.

Figure 13:
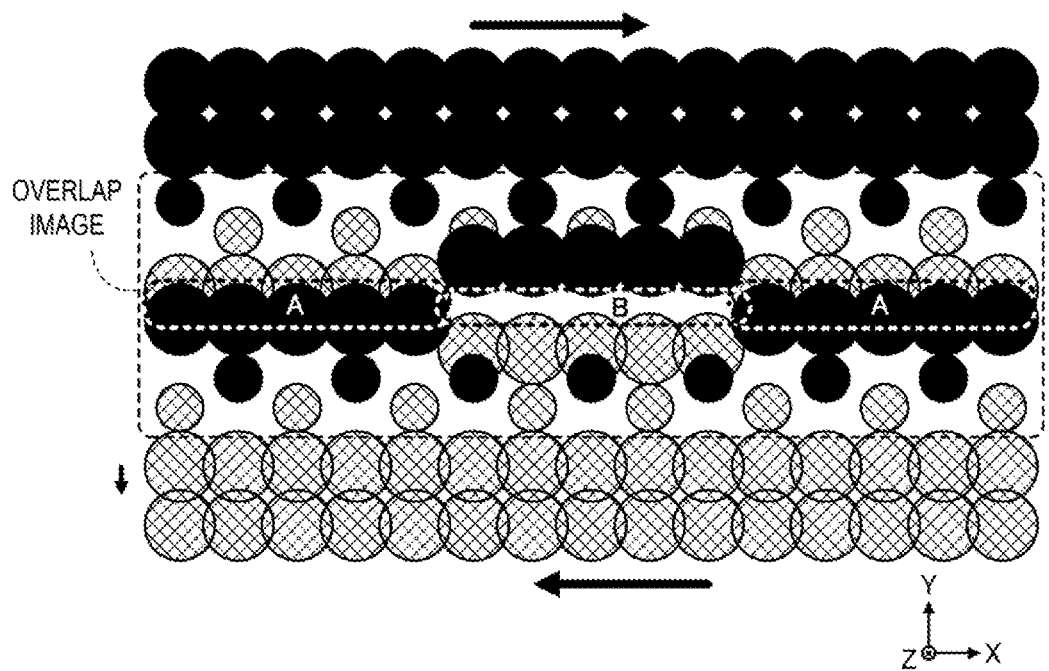
FIG. 13 illustrates a recording image in Example 1 in a case where dots formed by the second nozzle group are deviated by a half pitch in a −Y direction due to a movement error of the sub-scanning operation.

As apparent from FIG. 12 and FIG. 13, as compared to the case in FIG. 9 and FIG. 10, a ratio that the regions A in which the supplied ink amount is excessive and the regions B in which the applied ink amount is not sufficient are formed adjacent to each other is reduced.

Note that, the recording image based on the image data 80 of the recording target (refer to FIG. 3) is not limited to a solid recording image as illustrated in FIG. 11. Further, the number of dots successively formed at the predetermined interval in the sixth pattern P6 is not intended to be limited to five. Further, the number of dots successively formed in the respective raster lines (the first raster line R1 and the second raster line R2) are not necessarily required to be uniformly the same in number.

EXAMPLE 2

Figure 14:
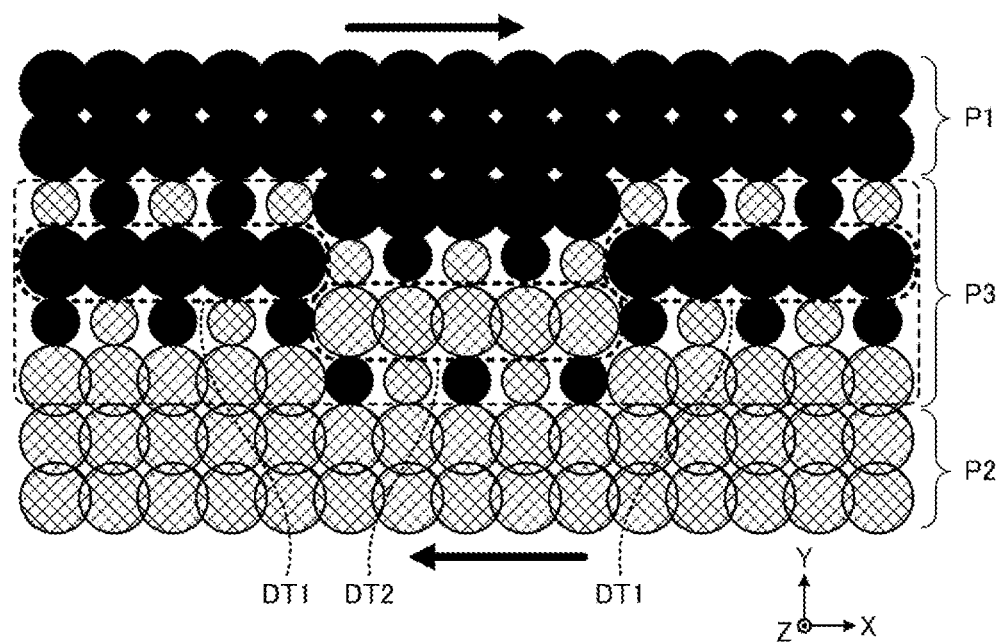
FIG. 14 is a schematic view illustrating a recording image in Example 2 in this exemplary embodiment.

FIG. 14 is a schematic view illustrating a recording image in Example 2 in this exemplary embodiment.

In Example 2, the configuration of the third pattern P3 being an overlap image region is changed from that in Example 1.

In Example 1, at the time of recording the overlap image, the third dot group (the fourth pattern P4 and the fifth pattern P5) is arranged at the boundary with the non-overlap image as an example of arranging the third dot group at at least one of positions adjacent, in the second direction that intersects with the first direction, to the first dot group and the second dot group. A characteristic of Example 2 resides in that the third dot group is arranged at a position on each side adjacent to the sub-scanning direction (Y-axis direction) of the first dot group, which is not adjacent to the non-overlap image, and the second dot group, which is not adjacent to the non-overlap image. Specifically, as illustrated in FIG. 14, at the time of recording the overlap image, the printer controller 111 generates the image data 84 such that five dots DT1 (the first dot group) indicated with black circles successively formed at positions that are not held in contact with the first pattern P1 and five dots DT2 (the second dot group) indicated with shaded circles successively formed at positions that are not held in contact with the second pattern P2 are arranged at a mutually exclusive position, and that the group (the third dot group), in which the first dots and the second dots are arrayed at the interval larger than the predetermined interval are arranged at a position on each side adjacent to the sub-scanning direction (Y-axis direction) of the respective dot groups (the first dot group and the second dot group), and generates the recording data based on the image data 84.

Figure 15:
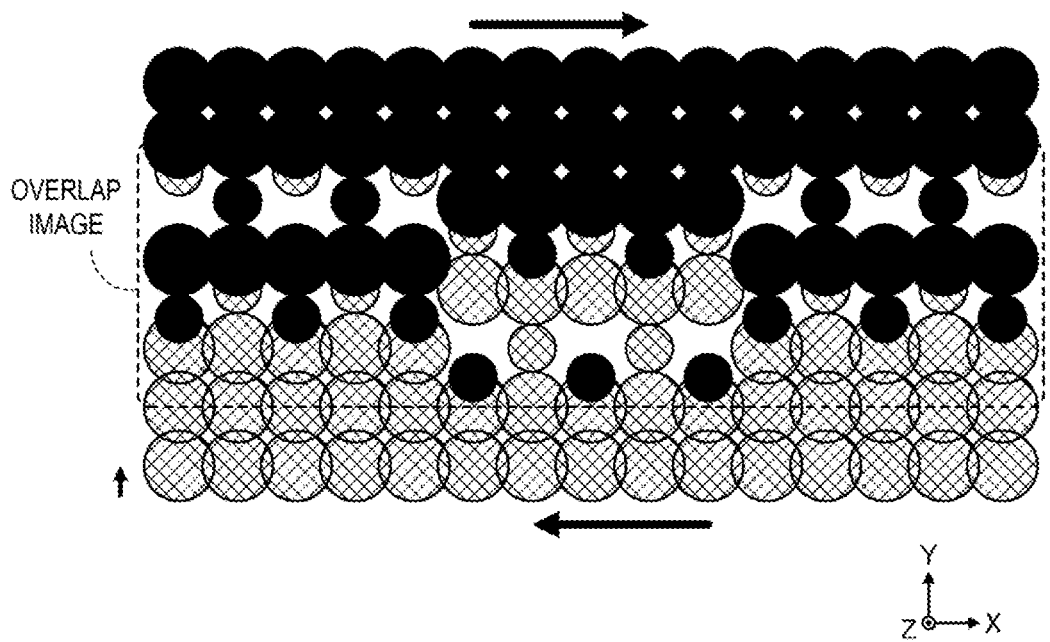
FIG. 15 illustrates a recording image in Example 2 in a case where dots formed by a second nozzle group are deviated by a half pitch in a +Y direction due to a movement error of a sub-scanning operation.
Figure 16:
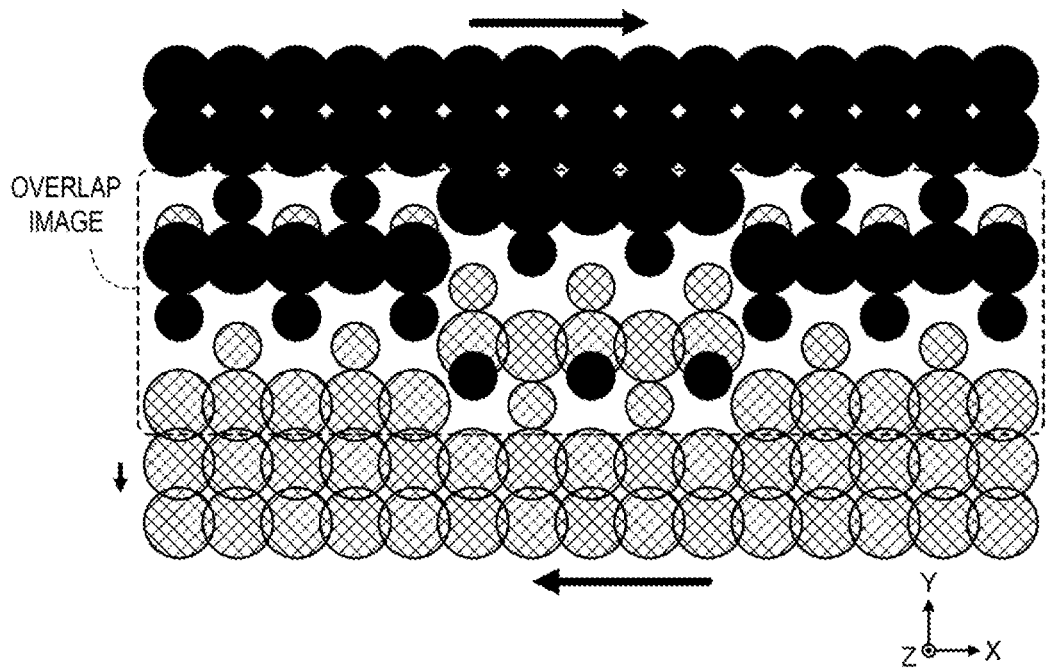
FIG. 16 illustrates a recording image in Example 2 in a case where dots formed by the second nozzle group are deviated by a half pitch in a −Y direction due to a movement error of the sub-scanning operation.

FIG. 15 illustrates a recording image in Example 2 in a case where dots formed by the second nozzle group are deviated by a half pitch in the +Y direction due to a movement error of the sub-scanning operation. FIG. 16 illustrates a recording image in Example 2 in a case where dots formed by the second nozzle group are deviated by a half pitch in the −Y direction due to the movement error of the sub-scanning operation.

As apparent from FIG. 15 and FIG. 16, unlike the related art and Example 1, even in the case where the movement error of the sub-scanning operation (deviation of substantially from a half pitch to one pitch) is caused, the regions A (regions in which large dots excessively gather (ten dots gather in each region) and hence the applied ink amount is excessive) and the regions B (regions in which dots are supposed to be formed but are not formed (regions in which five dots are supposed to be formed) and hence the applied ink amount is insufficient) are not formed. Thus, the overlap image is less liable to be visually recognized as banding which gives a feeling that something is wrong with respect to the non-overlap image.

As described above, according to the recording device and the recording method of this exemplary embodiment, the effects below can be obtained.

The overlap image includes a region in which the first dot group and the second dot group are arranged at mutually exclusive positions. In the first dot group, the first dots formed by the first nozzle group successively formed at the predetermined interval in the first direction. In the second dot group, the second dots formed by the second nozzle group are successively formed at the predetermined interval in the first direction. In such region, the dots in the first dot group and the second dot group are formed successively similarly to the dots in the non-overlap image. Thus, influence of the characteristic that the discharged ink droplet amount changes depending on the discharge cycle of the ink droplet (characteristic that the discharge amount of the ink droplet discharged in the overlap image region changes from the non-overlap image region depending of the discharge cycle of the ink droplet) can be reduced.

Further, at the time of recording the overlap image, the third dot group including the first dots and the second dots, which are arrayed at the interval larger than the predetermined interval, is arranged at least one position adjacent in the second direction that intersects with the first direction of the first dot group and the second dot group.

The third dot group includes the first dots and the second dots, which are arrayed at the interval larger than the predetermined interval. Thus, in a case where the amount of the ink droplet discharged by the recording head 11 when the discharge of the ink droplet is intermittently performed in a cycle longer than a predetermined cycle is reduced as compared to a case where the discharge of the ink droplet is successively performed a plurality of times in a predetermined short cycle, the amount of the ink droplet discharged in the image region formed by the third dot group is smaller than the amount of the ink droplet discharged in the image region formed by the dots in the first dot group and the second dot group. In other words, in a case where the amount of the ink droplet discharged by the recording head 11 when the discharge of the ink droplet is successively performed a plurality of times in the predetermined short cycle is increased as compared to a case where the discharge of the ink droplet is performed intermittently in a cycle longer than the predetermined cycle, the amount of the ink droplet discharged in the image region formed by the dots in the first dot group and the second dot group is increased compared to the amount of the ink droplet discharged in the image region formed by the third dot group. The third dot group is arranged at at least one position adjacent to the second direction of the first dot group and the second dot group. Thus, when deviation of the predetermined positions of the dots (the second dots) formed in the second direction by the second nozzle group with respect to the predetermined positions of the dots (the first dots) formed in the second direction by the first nozzle group is caused (provided that the deviation does not exceed a nozzle pitch in an alignment direction of the first nozzle group and the second nozzle group), an extent to which the first dot group and the second dot group overlap the third dot group is increased, and an extent to which the first dot group and the second dot group overlap each other is reduced. As a result, the ink droplet applied onto the recording medium 5 is prevented from being locally excessive. Further, the region in which the ink droplet is applied excessively and the region in which the application of the ink droplet is insufficient are prevented from being adjacent to each other. Accordingly, degradation of the recording quality is prevented.

Further, as in Example 1, at the time of recording the overlap image, in the case where the third dot group is arranged at the boundary with the non-overlap image, when deviation of the predetermined positions of the dots (the second dots) formed in the second direction by the second nozzle group with respect to the predetermined positions of the dots (the first dots) formed in the second direction by the first nozzle group is caused (provided that the deviation does not exceed a nozzle pitch in an alignment direction of the first nozzle group and the second nozzle group), the third dot group included in the overlap image overlaps the non-overlap image, and the first dot group and the second dot group included in the overlap image do not overlap the non-overlap image. As a result, at the boundary with the non-overlap image, the ink droplet applied onto the recording medium 5 is prevented from being locally excessive. Further, the region in which the ink droplet is applied excessively and the region in which the application of the ink droplet is insufficient are prevented from being adjacent to each other. Accordingly, degradation of the recording quality is prevented.

Further, as in Example 2, at the time of recording the overlap image, in the case where the third dot group is arranged at a position on each side adjacent to the second direction of the first group, which is not adjacent to the non-overlap image, and the second dot group, which is not adjacent to the non-overlap image, when deviation of the predetermined positions of the dots (the second dots) formed in the second direction by the second nozzle group with respect to the predetermined positions of the dots (the first dots) formed in the second direction by the first nozzle group is caused (provided that the deviation does not exceed a nozzle pitch in an alignment direction of the first nozzle group and the second nozzle group), the first dot group and the second dot group overlap the third dot group, and the first dot group and the second dot group do not overlap each other. As a result, in the case where the amount of the ink droplet discharged by the recording head 11 when the discharge of the ink droplet is successively performed a plurality of times in the predetermined short cycle is increased as compared to a case where the discharge of the ink droplet is performed intermittently in a cycle longer than the predetermined cycle, the ink droplet applied onto the recording medium 5 is prevented from being locally excessive. Further, the region in which the ink droplet is applied excessively and the region in which the application of the ink droplet is insufficient are prevented from being adjacent to each other. Accordingly, degradation of the recording quality is prevented.

Exemplary Embodiment 2

Next, a recording device and a recording method according to Exemplary Embodiment 2 are described. Note that, the same constituents as those in the exemplary embodiment described above are given the same reference signs, and redundant description of these constituents will be omitted.

In Exemplary Embodiment 1, description is made of a case where the printer 100 included in the recording system 1 as the "recording device" is a serial printer, but may be a line printer.

Figure 17:
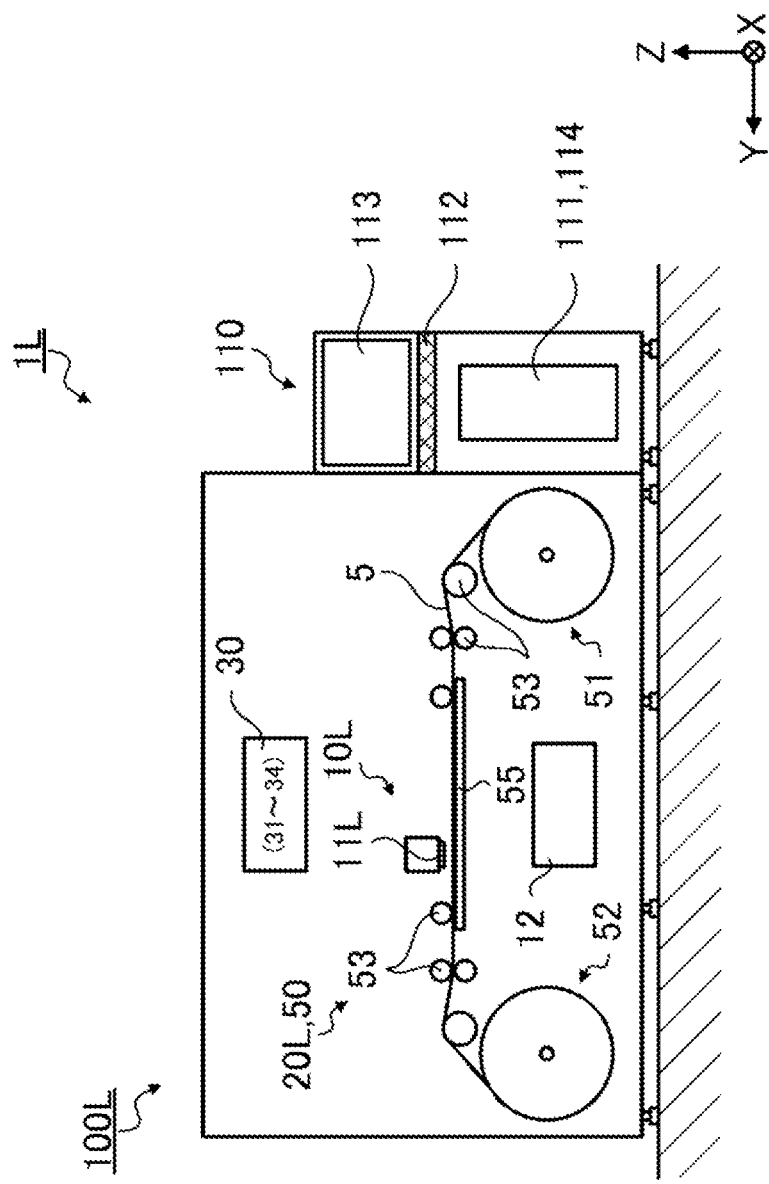
FIG. 17 is a front view illustrating a configuration of a recording device according to Exemplary Embodiment 2.
Figure 18:
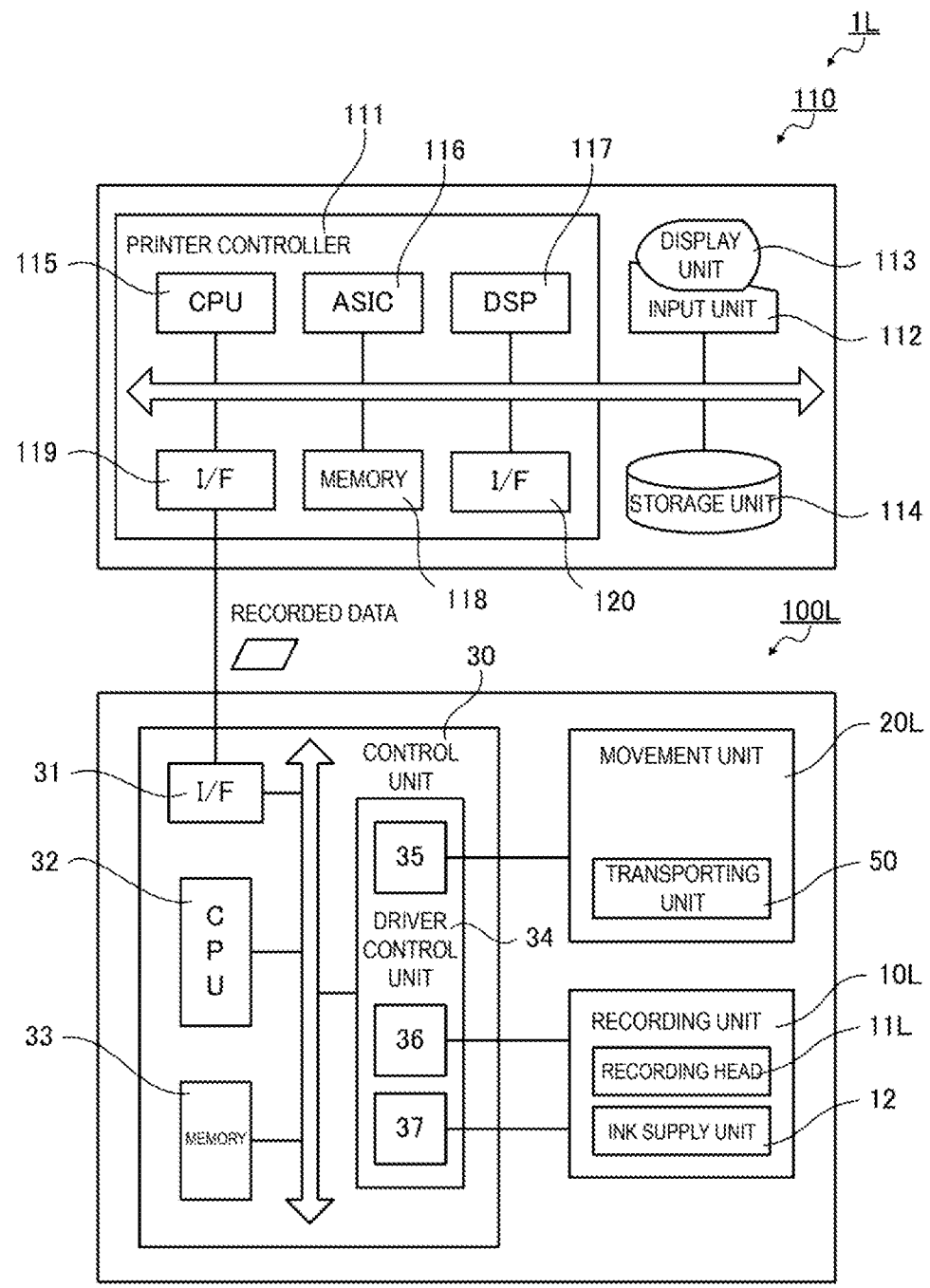
FIG. 18 is a block diagram illustrating the configuration of the recording device according to Exemplary Embodiment 2.

FIG. 17 is a front view illustrating a configuration of a recording system 1L according to Exemplary Embodiment 2, and FIG. 18 is a block diagram of the same.

The recording system 1L includes a printer 100L in place of the printer 100 in Exemplary Embodiment 1. The printer 100L is an ink-jet-type line printer that records a desired image (recording image) on a recording medium 5 having an elongated shape, which is fed in a state of being wound into a roll, based on recording data received from the image processor 110.

Basic Configuration of Printer 100L

The printer 100L is configured with a recording unit 10L, a movement unit 20L, a control unit 30, and the like. Upon reception of recording data from the image processor 110, the printer 100L controls the recording unit 10L and the movement unit 20L by the controller 30 and records an image (performs image formation) on the recording medium 5.

The recording unit 10L includes a recording head 11L, the ink supply unit 12, and the like.

The movement unit 20L includes the transporting unit 50 and the like. The transporting unit 50 includes a supply portion 51, a storage portion 52, transport rollers 53, a platen 55, and the like.

Figure 19:
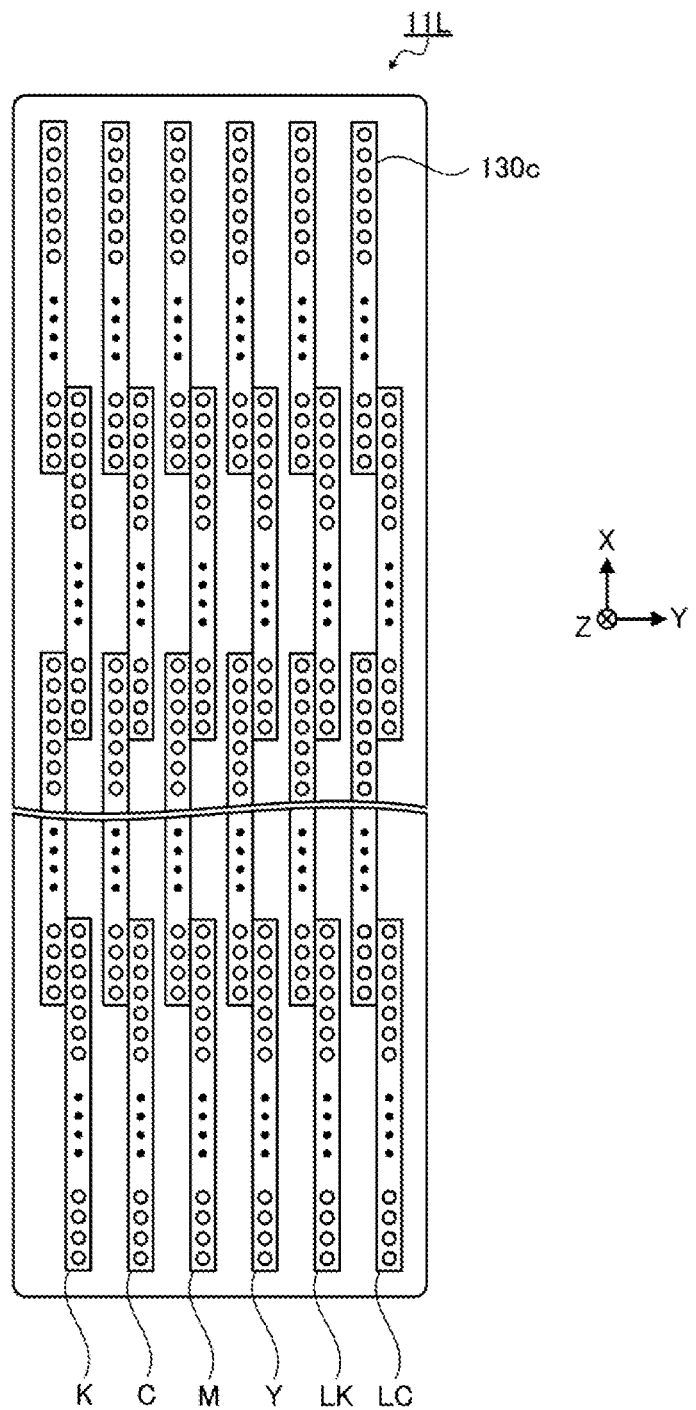
FIG. 19 is a schematic view illustrating an example of arrangement of nozzles when viewed from a lower surface of a recording head included in the recording device according to Exemplary Embodiment 2.

FIG. 19 is a schematic view illustrating an example of arrangement of nozzles when viewed from a lower surface of the recording head 11L.

As illustrated in FIG. 19, a recording head 11L is a so-called line head, and includes six nozzle rows (a black ink nozzle row K, a cyan ink nozzle row C, a magenta ink nozzle row M, a yellow ink nozzle row Y, a gray ink nozzle row LK, and a light cyan ink nozzle row LC). Each of the six nozzle rows includes a plurality of nozzle chips 130c including a plurality of nozzles for discharging ink of the same color for each row in the width direction (X-axis direction) of the recording medium 5 that intersects with the transport direction (Y-axis direction) of the recording medium 5 over a length exceeding a maximum width of the recording medium 5.

Further, the respective nozzle chips 130c are provided so that four nozzles at an end of one of the nozzle chips 130c adjacent to four nozzles at an end of the other of adjacent nozzle chips 130c overlap each other at positions in the Y-axis direction.

Figure 20:
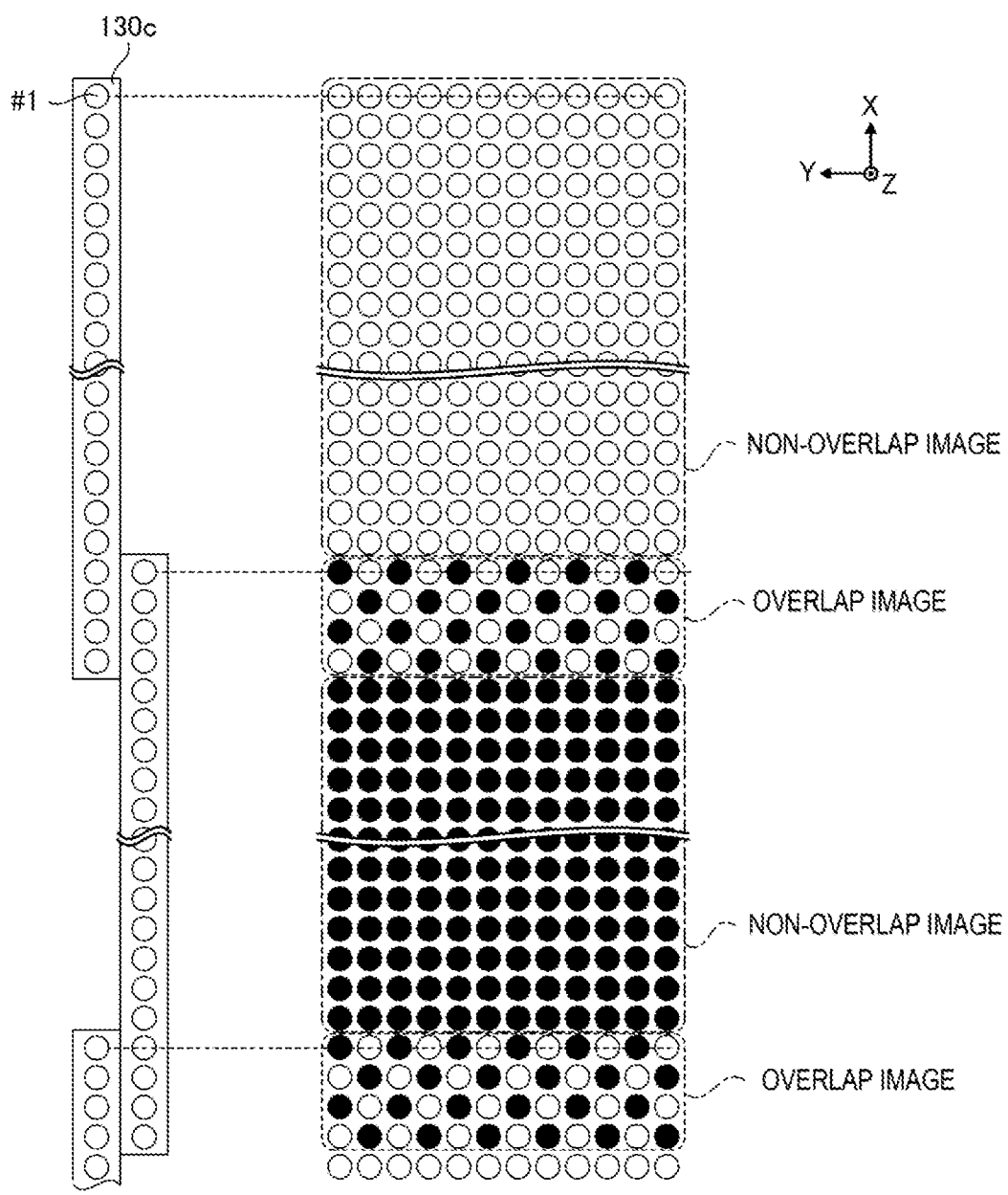
FIG. 20 is a schematic view illustrating dot rows formed by a line head.

FIG. 20 is a view illustrating a state of the dot rows formed by the line head including the plurality of nozzle chips 130c.

While the recording medium 5 is moved in the transport direction (+Y direction) on the platen 55, the ink droplet is discharged from the nozzle at a predetermined timing. Accordingly, the recording image can be formed.

In the line head in which the nozzle chips 130c are arrayed in series, at a joint portion of the nozzle chips 130c, banding (a white streak formed by a large interval between dots or a black streak formed by a small interval between dots) may still be caused. Thus, in order to suppress banding, four nozzles at an end of one of the nozzle chips 130c adjacent to four nozzles at an end of the other of adjacent nozzle chips 130c overlap each other at positions in the Y-axis direction, and the boundary of the band becomes a blur. With this, the banding caused by the light-colored and dark-colored streaks can be suppressed. That is, the non-overlap image and the overlap image form a recording image.

Also with the recording by the line head having the above-mentioned configuration, in the overlap image region, banding such that the light-colored and dark-colored streaks are visually recognized may be caused due to variation in ink discharge performance of the nozzle chips 130c and variation in mounting accuracy of the nozzle chips 130c. With regard to this banding, recording performed with the similar idea of the recording method described in Exemplary Embodiment 1 can reduce an extent to which the banding is visually recognized.

That is, the recording system 1L being the "recording device" according to Exemplary Embodiment 2 includes a recording unit 10L and the printer controller 111. The recording unit 10L includes the first nozzle group in which the plurality of first nozzles are arrayed in the alignment direction (X-axis direction different from that in Exemplary Embodiment 1) and the second nozzle group in which the plurality of second nozzles are arrayed in the alignment direction, and records dots by discharging the ink droplets onto the recording medium 5 while relatively moving in the transport direction (Y-axis direction) being the "first direction" that intersects with the alignment direction.

Further, the first nozzle group and the second nozzle group are provided so that the positions of the first nozzles in one end region in the alignment direction of the first nozzle group and the positions of the second nozzles in another end region in the alignment direction of the second nozzle group in the width direction (X-axis direction) of the recording medium 5 being the "second direction" that intersects with the transport direction overlap each other. That is, the first nozzle group is one of the adjacent nozzle chips 130c, and the second nozzle group is another one of the adjacent nozzle chips 130c. Further, in the following description, the nozzles included in the nozzle chip 130c corresponding to the first nozzle group are the "first nozzles", and the dots formed by the first nozzles are the "first dots". Further, the nozzles included in the nozzle chip 130c corresponding to the second nozzle group are the "second nozzles", and the dots formed by the second nozzles are the "second dots".

Figure 21:
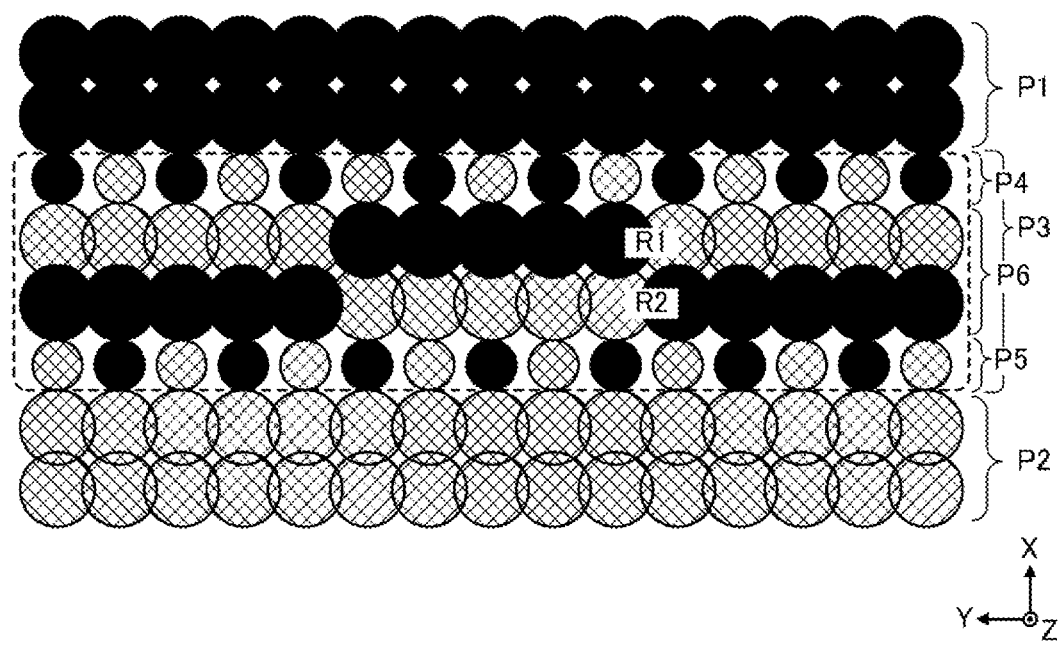
FIG. 21 is a schematic view illustrating a recording image recorded by the recording device according Exemplary Embodiment 2.

FIG. 21 is a schematic view illustrating a recording image recorded by the recording system 1L.

FIG. 21 is a solid recording image (image with a dot filling ratio of 100% in a dot matrix). The black circles in FIG. 21 are the first dots formed by the first nozzles. That is, the black circles are dots formed by one of the adjacent nozzle chips 130c (the first nozzle group). Further, the shaded circles are the second dots formed by the second nozzles. That is, the shaded circles are dots formed by the other of the adjacent nozzle chips 130c (the second nozzle group).

The printer controller 111 controls the recording unit 10L to record the first pattern P1, the second pattern P2, and the third pattern P3 on the recording medium 5. The first pattern P1 is recorded by the first nozzles that are at the positions not overlapping the second nozzles in the width direction of the recording medium 5 (X-axis direction). The second pattern P2 is recorded by the second nozzles that are at the positions not overlapping the first nozzles in the width direction of the recording medium 5 (X-axis direction). The third pattern P3 recorded by the first nozzles and the second nozzles that overlap each other in the width direction of the recording medium 5 (X-axis direction).

Here, the third pattern P3 is formed of the fourth pattern P4 held in contact with the first pattern P1, the fifth pattern P5 held in contact with the second pattern P2, and the sixth pattern P6 sandwiched between the fourth pattern P4 and the fifth pattern P5.

The sixth pattern P6 is a pattern formed of the first raster line R1 and the second raster line R2.

In the first raster line R1, the first dot group and the second dot group are alternately formed in the transport direction (Y-axis direction). In the first dot group, the first dots are successively formed in the transport direction (Y-axis direction) by the first nozzles. In the second dog group, the second dots are successively formed in the transport direction (Y-axis direction) by the second nozzles.

In the second raster line R2, the second dots, which are adjacent to the first dots of the first raster line R1 in the width direction of the recording medium 5 (X-axis direction), and the first dots adjacent to the second dots of the first raster line R1 in the width direction of the recording medium 5 (X-axis direction), are formed in the width direction of the recording medium 5 (X-axis direction).

Each of the fourth pattern P4 and the fifth pattern P5 is a pattern in which the first dots and the second dots are alternately formed in the transport direction (Y-axis direction).

As described above, the printer controller 111 allocates discharge of ink droplets to the respective nozzles at the respective timing so that the recording image is recorded with the above-mentioned patterns (the first pattern P1 to the sixth pattern P6), based on the image data 83 (pixel data in the matrix pattern), which is generated by the halftone processing, in the rasterization processing in the flow for generating the recording data described with reference to FIG. 3. In this manner, the image data 84 (refer to FIG. 3) is generated. Further, in the subsequent processing, the printer controller 111 generates recording data 85 based on the image data 84 generated as described above, and causes the printer 100 to perform recording. A series of this recording method performed based on the recording data 85 generated by the printer controller 111 is none other than the recoding method according to this exemplary embodiment.

Note that, the rasterization processing in Exemplary Embodiment 1 includes the allocation processing for allocating the image data 83, which is formed of the pixel data after the halftone processing, to the respective pass operations for discharging ink droplets during the main scanning movement of the recording head 11 (nozzle rows). In place of this, the rasterization processing in this exemplary embodiment includes the allocation processing of allocating the image data 83, which is formed of the pixel data after the halftone processing, to the nozzles included in the recording head 11L so that the ink droplets are discharged onto the recording medium 5 relatively moving in the transport direction (Y-axis direction).

FIG. 21 is a view corresponding to the recording image in Example 1 in Exemplary Embodiment 1 (FIG. 11). That is, due to variation in ink discharge performance of the nozzle chips 130c and variation in mounting accuracy of the nozzle chips 130c, the dot formation positions are deviated in the width direction of the recording medium 5 (X-axis direction), and the banding may be visually recognized accordingly. Even in such case with the line printer in which the first nozzle group and the second nozzle group are fixed, similarly to the case in Exemplary Embodiment 1, the recording device according to this exemplary embodiment can reduce the degree of the banding.

As described above, according to the recording device and the recording method of this exemplary embodiment, the effects below can be obtained.

In the first raster line R1 and the second raster line R2 forming the sixth pattern, the dots are successively formed similarly to the first pattern recorded by the first nozzles and the second pattern recorded by the second nozzles. Thus, the influence of the characteristic that the discharge amount of the ink droplet changes depending on the discharge cycle of the ink droplet (characteristic that the discharge amount of the ink droplet discharged to the sixth pattern changes from the first pattern and the second pattern depending on the discharge cycle of the ink droplet) can be reduced.

Further, in the fourth pattern and the fifth pattern, the first dots and the second dots are alternately formed. Thus, in the case where the amount of the ink droplet discharged by the recording head 11L when the discharge of the ink droplet is intermittently performed in a cycle longer than a predetermined cycle is reduced as compared to the case where the discharge of the ink droplet is successively performed a plurality of times in a predetermined short cycle, the amount of the ink droplet discharged for forming the fourth pattern and the fifth pattern is reduced as compared to the amount of the ink droplet discharged for forming the first pattern, the second pattern, and the sixth pattern.

Further, at the time of recording the overlap image, the fourth pattern and the fifth pattern are positioned at the boundary with the non-overlap image. Thus, even in a case where deviation of the predetermined positions of the dots (the second dots) formed by the second nozzle group in the width direction of the recording medium 5 (X-axis direction) with respect to the predetermined positions of the dots (the first dots) formed by the first nozzle group in the width direction of the recording medium 5 (X-axis direction) is caused (provided that the deviation does not exceed a nozzle pitch in the alignment direction of the first nozzle group and the second nozzle group), the ink droplet applied onto the recording medium 5 is prevented from being locally excessive at the boundary with the non-overlap image. Further, the region in which the ink droplet is applied excessively and the region in which the application of the ink droplet is insufficient are prevented from being adjacent to each other. Accordingly, degradation of the recording quality is prevented.

Contents derived from the exemplary embodiments are described below.

A recording device according to the present disclosure includes a recording head including a first nozzle group and a second nozzle group in which a plurality of nozzles are arrayed in an alignment direction and a control unit, the recording device being configured to record a recording image including an overlap image recorded by the first nozzle group and the second nozzle group by discharging liquid while the recording head and a recording medium move relative to each other in a first direction that intersects with the alignment direction, and a non-overlap image recorded by the first nozzle group or the second nozzle group, wherein when the overlap image is recorded that includes a first dot group in which first dots are successively formed by the first nozzle group at a predetermined interval in the first direction, a second dot group in which second dots are successively formed by the second nozzle group at the predetermined interval in the first direction, and a third dot group including the first dots and the second dots, which are arrayed at an interval longer than the predetermined interval, the control unit arranges the first dot group and the second dot group at mutually exclusive positions, and arranges the third dot group at at least one of positions adjacent, in a second direction that intersects with the first direction, to the first dot group and the second dot group.

According to this configuration, the overlap image includes a region in which the first dot group and the second dot group are arranged at the mutually exclusive positions. In the first dot group, the first dots formed by the first nozzle group are successively formed at the predetermined interval in the first direction. In the second dot group, the second dots formed by the second nozzle group are successively formed at the predetermined interval in the first direction. In such region, the dots in the first dot group and the second dot group are formed successively similarly to the dots in the non-overlap image. Thus, influence of the characteristic that the discharged droplet amount changes depending on the discharge cycle of the droplet (characteristic that the discharge amount of the droplet discharged in the overlap image region changes from the non-overlap image region depending of the discharge cycle of the droplet) can be reduced.

Further, at the time of recording the overlap image, the third dot group including the first dots and the second dots, which are arrayed at the interval larger than the predetermined interval, is arranged at at least one position adjacent to the second direction that intersects with the first direction of the first dot group and the second dot group.

The third dot group includes the first dots and the second dots, which are arrayed at the interval larger than the predetermined interval. Thus, in a case where the amount of the droplet discharged by the recording head when the discharge of the droplet is intermittently performed in a cycle longer than a predetermined cycle is reduced as compared to a case where the discharge of the droplet is successively performed a plurality of times in a predetermined short cycle, the amount of the droplet discharged in the image region formed by the third dot group is smaller than the amount of the droplet discharged in the image region formed by the dots in the first dot group and the second dot group. In other words, in a case where the amount of the droplet discharged by the recording head when the discharge of the droplet is successively performed a plurality of times in the predetermined short cycle is increased as compared to a case where the discharge of the droplet is performed intermittently in a cycle longer than the predetermined cycle, the amount of the droplet discharged in the image region formed by the dots in the first dot group and the second dot group is increased compared to the amount of the droplet discharged in the image region formed by the third dot group. The third dot group is arranged at at least one position adjacent to the second direction of the first dot group and the second dot group. Thus, when deviation of the predetermined positions of the dots (the second dots) formed in the second direction by the second nozzle group with respect to the predetermined positions of the dots (the first dots) formed in the second direction by the first nozzle group is caused (provided that the deviation does not exceed a nozzle pitch in an alignment direction of the first nozzle group and the second nozzle group), an extent to which the first dot group and the second dot group overlap the third dot group is increased, and an extent to which the first dot group and the second dot group overlap each other is reduced. As a result, the ink droplet applied onto the recording medium is prevented from being locally excessive. Further, the region in which the ink droplet is applied excessively and the region in which the application of the ink droplet is insufficient are prevented from being adjacent to each other. Accordingly, degradation of the recording quality is prevented.

In the above-mentioned recording device, it is preferred that the control unit is configured to arrange, when the overlap image is recorded, the third dot group at positions on both sides adjacent, in the second direction, to the first group, which is not adjacent to the non-overlap image, and the second dot group, which is not adjacent to the non-overlap image.

According to this configuration, at the time of recording the overlap image, the third dot group is arranged at the position on each side adjacent to the second direction of the first dot group and the second dot group. Thus, when deviation of the predetermined positions of the dots (the second dots) formed in the second direction by the second nozzle group with respect to the predetermined positions of the dots (the first dots) formed in the second direction by the first nozzle group is caused (provided that the deviation does not exceed a nozzle pitch in an alignment direction of the first nozzle group and the second nozzle group), the first dot group and the second dot group overlap the third dot group, and the first dot group and the second dot group do not overlap each other. As a result, in the case where the amount of the droplet discharged by the recording head when the discharge of the droplet is successively performed a plurality of times in the predetermined short cycle is increased as compared to a case where the discharge of the droplet is performed intermittently in a cycle longer than the predetermined cycle, the droplet applied onto the recording medium is prevented from being locally excessive. Further, the region in which the droplet is applied excessively and the region in which the application of the droplet is insufficient are prevented from being adjacent to each other. Accordingly, degradation of the recording quality is prevented.

In the above-mentioned recording device, it is preferred that the control unit is configured to arrange, when the overlap image is recorded, the third dot group at a boundary with the non-overlap image.

According to this configuration, at the time of recording the overlap image, the third dot group is arranged at the boundary with the non-overlap image. Thus, even when deviation of the predetermined positions of the dots (the second dots) formed in the second direction by the second nozzle group with respect to the predetermined positions of the dots (the first dots) formed in the second direction by the first nozzle group is caused (provided that the deviation does not exceed a nozzle pitch in an alignment direction of the first nozzle group and the second nozzle group), the third dot group included in the overlap image overlaps the non-overlap image, and the first dot group and the second dot group included in the overlap image do not overlap the non-overlap image. As a result, at the boundary with the non-overlap image, the droplet applied onto the recording medium is prevented from being locally excessive. Further, the region in which the droplet is applied excessively and the region in which the application of the droplet is insufficient are prevented from being adjacent to each other. Accordingly, degradation of the recording quality is prevented.

A recording device according to the present disclosure includes a recording unit including a first nozzle group in which a plurality of first nozzles are arrayed in an alignment direction and a second nozzle group in which a plurality of second nozzles are arrayed in the alignment direction, the recording unit being configured to record dots by discharging a droplet onto a recording medium while moving relatively in a first direction that intersects with the alignment direction, and a control unit, wherein the first nozzle group and the second nozzle group are provided so that positions of the plurality of first nozzles of the first nozzle group in an end region on one side in the alignment direction and positions of the plurality of second nozzles of the second nozzle group in an end region on the other side in the alignment direction overlap each other in a second direction that intersects with the first direction, the control unit is configured to control the recording unit to record, on the recording medium, a first pattern recorded by the plurality of first nozzles at positions not overlapping the plurality of second nozzles in the second direction, a second pattern recorded by the plurality of second nozzles at positions not overlapping the plurality of first nozzles in the second direction, and a third pattern recorded by the plurality of first nozzles and the plurality of second nozzles overlapping one another in the second direction, the third pattern is formed of a forth pattern adjacent to the first pattern, a fifth pattern adjacent to the second pattern, and a sixth pattern sandwiched between the fourth pattern and the fifth pattern, the sixth pattern includes a first raster line and a second raster line, in the first raster line, a first dot group in which first dots are successively formed by the plurality of first nozzles in the first direction and a second dot group in which second dots are successively formed by the plurality of second nozzles in the first direction are alternately formed in the first direction, in the second raster line, the second dots adjacent to the first dots of the first raster line in the second direction and the first dots adjacent to the second dots of the first raster line in the second direction are formed in the second direction, and in the fourth pattern and the fifth pattern, the first dots and the second dots are alternately formed in the first direction.

According to this configuration, in the first raster line and the second raster line forming the sixth pattern, the dots are successively formed similarly to the first pattern recorded by the first nozzles and the second pattern recorded by the second nozzles. Thus, the influence of the characteristic that the discharge amount of the droplet changes depending on the discharge cycle of the droplet (characteristic that the discharge amount of the droplet discharged to the sixth pattern changes from the first pattern and the second pattern depending on the discharge cycle of the droplet) can be reduced.

Further, in the fourth pattern and the fifth pattern, the first dots and the second dots are alternately formed. Thus, in the case where the amount of the droplet discharged by the recording head when the discharge of the droplet is intermittently performed in a cycle longer than a predetermined cycle is reduced as compared to the case where the discharge of the droplet is successively performed a plurality of times in a predetermined short cycle, the amount of the droplet discharged for forming the fourth pattern and the fifth pattern is reduced as compared to the amount of the droplet discharged for the first pattern, the second pattern, and the sixth pattern.

Further, at the time of recording the overlap image, the fourth pattern and the fifth pattern are positioned at the boundary with the non-overlap image. Thus, even in a case where deviation of the predetermined positions of the dots (the second dots) formed by the second nozzle group in the second direction with respect to the predetermined positions of the dots (the first dots) formed by the first nozzle group in the second direction is caused (provided that the deviation does not exceed a nozzle pitch in the alignment direction of the first nozzle group and the second nozzle group), the droplet applied onto the recording medium is prevented from being locally excessive at the boundary with the non-overlap image. Further, the region in which the droplet is applied excessively and the region in which the application of the droplet is insufficient are prevented from being adjacent to each other. Accordingly, degradation of the recording quality is prevented.

A recording method according to the present disclosure is a recording method for recording a recording image by discharging liquid while a recording head including a first nozzle group and a second nozzle group in which a plurality of nozzles are arrayed in an alignment direction and a recording medium move relative to each other in a first direction that intersects with the alignment direction, the recording image including an overlap image recorded by the first nozzle group and the second nozzle group, and a non-overlap image recorded by the first nozzle group or the second nozzle group, the recording method including, when the overlap image is recorded that includes a first dot group in which first dots are successively formed by the first nozzle group at a predetermined interval in the first direction, a second dot group in which second dots are successively formed by the second nozzle group at the predetermined interval in the first direction, and a third dot group including the first dots and the second dots, which are arrayed at an interval longer than the predetermined interval, arranging the first dot group and the second dot group at mutually exclusive positions, and arranging the third dot group at at least one of positions adjacent, in a second direction that intersects with the first direction, to the first dot group and the second dot group.

According to this method, the overlap image includes a region in which the first dot group and the second dot group are arranged at the mutually exclusive positions. In the first dot group, the first dots formed by the first nozzle group are successively formed at the predetermined interval in the first direction. In the second dot group, the second dots formed by the second nozzle group are successively formed at the predetermined interval in the first direction. In such region, the dots in the first dot group and the second dot group are formed successively similarly to the dots in the non-overlap image. Thus, influence of the characteristic that the discharged droplet amount changes depending on the discharge cycle of the droplet (characteristic that the discharge amount of the droplet discharged in the overlap image region changes from the non-overlap image region depending of the discharge cycle of the droplet) can be reduced.

Further, at the time of recording the overlap image, the third dot group including the first dots and the second dots, which are arrayed at the interval larger than the predetermined interval, is arranged at at least one position adjacent to the second direction that intersects with the first direction of the first dot group and the second dot group.

The third dot group includes the first dots and the second dots, which are arrayed at the interval larger than the predetermined interval. Thus, in a case where the amount of the droplet discharged by the recording head when the discharge of the droplet is intermittently performed in a cycle longer than a predetermined cycle is reduced as compared to a case where the discharge of the droplet is successively performed a plurality of times in a predetermined short cycle, the amount of the droplet discharged in the image region formed by the third dot group is smaller than the amount of the droplet discharged in the image region formed by the dots in the first dot group and the second dot group. In other words, in the case where the amount of the droplet discharged by the recording head when the discharge of the droplet is successively performed a plurality of times in the predetermined short cycle is increased as compared to a case where the discharge of the droplet is performed intermittently in a cycle longer than the predetermined cycle, the amount of the droplet discharged in the image region formed by the dots in the first dot group and the second dot group is increased compared to the amount of the droplet discharged in the image region formed by the third dot group. The third dot group is arranged at at least one position adjacent to the second direction of the first dot group and the second dot group. Thus, when deviation of the predetermined positions of the dots (the second dots) formed in the second direction by the second nozzle group with respect to the predetermined positions of the dots (the first dots) formed in the second direction by the first nozzle group is caused (provided that the deviation does not exceed a nozzle pitch in an alignment direction of the first nozzle group and the second nozzle group), an extent to which the first dot group and the second dot group overlap the third dot group is increased, and an extent to which the first dot group and the second dot group overlap each other is reduced. As a result, the ink droplet applied onto the recording medium is prevented from being locally excessive. Further, the region in which the ink droplet is applied excessively and the region in which the application of the ink droplet is insufficient are prevented from being adjacent to each other. Accordingly, degradation of the recording quality is prevented.

A recording method according to the present disclosure is a recording method for recording dots by discharging a droplet onto a recording medium while a first nozzle group in which a plurality of first nozzles are arrayed in an alignment direction and a second nozzle group in which a plurality of second nozzles are arrayed in the alignment direction move relatively in a first direction that intersects with the alignment direction, the first nozzle group and the second nozzle group being provided so that positions of the plurality of first nozzles of the first nozzle group in an end region on one side in the alignment direction and positions the plurality of second nozzles of the second nozzle group in an end region on the other side in the alignment direction overlap in a second direction that intersects with the first direction, the recording method including recording on the recording medium, a first pattern recorded by the plurality of first nozzles at positions not overlapping the plurality of second nozzles in the second direction, a second pattern recorded by the plurality of second nozzles at positions not overlapping the plurality of first nozzles in the second direction, and a third pattern recorded by the plurality of first nozzles and the plurality of second nozzles overlapping one another in the second direction, wherein the third pattern is formed of a forth pattern adjacent to the first pattern, a fifth pattern adjacent to the second pattern, and a sixth pattern sandwiched between the fourth pattern and the fifth pattern, the sixth pattern includes a first raster line and a second raster line, in the first raster line, a first dot group in which first dots are successively formed by the plurality of first nozzles in the first direction and a second dot group in which second dots are successively formed by the plurality of second nozzles in the first direction are alternately formed in the first direction, in the second raster line, the second dots adjacent to the first dots of the first raster line in the second direction and the first dots adjacent to the second dots of the first raster line in the second direction are formed in the second direction, and in the fourth pattern and the fifth pattern, the first dots and the second dots are alternately formed in the first direction.

According to this method, in the first raster line and the second raster line forming the sixth pattern, the dots are successively formed similarly to the first pattern recorded by the first nozzles and the second pattern recorded by the second nozzles. Thus, the influence of the characteristic that the discharge amount of the droplet changes depending on the discharge cycle of the droplet (characteristic that the discharge amount of the droplet discharged to the sixth pattern changes from the first pattern and the second pattern depending on the discharge cycle of the droplet) can be reduced.

Further, in the fourth pattern and the fifth pattern, the first dots and the second dots are alternately formed. Thus, in the case where the amount of the droplet discharged by the first nozzles and the second nozzles when the discharge of the droplet is intermittently performed in a cycle longer than a predetermined cycle is reduced as compared to the case where the discharge of the droplet is successively performed a plurality of times in a predetermined short cycle, the amount of the droplet discharged for forming the fourth pattern and the fifth pattern is reduced as compared to the amount of the droplet discharged for the first pattern, the second pattern, and the sixth pattern.

Further, at the time of recording the overlap image, the fourth pattern and the fifth pattern are positioned at the boundary with the non-overlap image. Thus, even in a case where deviation of the predetermined positions of the dots (the second dots) formed by the second nozzle group in the second direction with respect to the predetermined positions of the dots (the first dots) formed by the first nozzle group in the second direction is caused (provided that the deviation does not exceed a nozzle pitch in the alignment direction of the first nozzle group and the second nozzle group), the droplet applied onto the recording medium is prevented from being locally excessive at the boundary with the non-overlap image. Further, the region in which the droplet is applied excessively and the region in which the application of the droplet is insufficient are prevented from being adjacent to each other. Accordingly, degradation of the recording quality is prevented.

This application claims priority under 35 U.S.C. § 119 to Japanese Patent Application No. 2018-061405, filed Mar. 28 2018. The entire disclosure of Japanese Patent Application No. 2018-061405 is hereby incorporated herein by reference.

What is claimed is:

1. A recording device comprising:
a recording head including a first nozzle group and a second nozzle group in which a plurality of nozzles are arrayed in an alignment direction; and
a control unit,
the recording device being configured to record a recording image including:
an overlap image recorded by the first nozzle group and the second nozzle group by discharging liquid while the recording head and a recording medium move relative to each other in a first direction that intersects with the alignment direction; and
a non-overlap image recorded by the first nozzle group or the second nozzle group, wherein
when the overlap image is recorded that includes a first dot group in which first dots are successively formed by the first nozzle group at a predetermined interval in the first direction, a second dot group in which second dots are successively formed by the second nozzle group at the predetermined interval in the first direction, and a third dot group including the first dots and the second dots, which are arrayed at an interval longer than the predetermined interval, the control unit arranges the first dot group and the second dot group at mutually exclusive positions, and arranges the third dot group at at least one of positions adjacent, in a second direction that intersects with the first direction, to the first dot group and the second dot group.

2. The recording device according to claim 1, wherein the control unit is configured to arrange, when the overlap image is recorded, the third dot group at positions on both sides adjacent, in the second direction, to the first group, which is not adjacent to the non-overlap image, and the second dot group, which is not adjacent to the non-overlap image.

3. The recording device according to claim 1, wherein, the control unit is configured to arrange, when the overlap image is recorded, the third dot group at a boundary with the non-overlap image.

4. A recording device comprising:
a recording unit including a first nozzle group in which a plurality of first nozzles are arrayed in an alignment direction and a second nozzle group in which a plurality of second nozzles are arrayed in the alignment direction, the recording unit being configured to record dots by discharging a droplet onto a recording medium while moving relatively in a first direction that intersects with the alignment direction; and
a control unit, wherein
the first nozzle group and the second nozzle group are provided so that positions of the plurality of first nozzles of the first nozzle group in an end region on one side in the alignment direction and positions of the plurality of second nozzles of the second nozzle group in an end region on the other side in the alignment direction overlap in a second direction that intersects with the first direction,
the control unit is configured to control the recording unit to record, on the recording medium:
a first pattern recorded by the plurality of first nozzles at positions not overlapping the plurality of second nozzles in the second direction;
a second pattern recorded by the plurality of second nozzles at positions not overlapping the plurality of first nozzles in the second direction; and
a third pattern recorded by the plurality of first nozzles and the plurality of second nozzles overlapping one another in the second direction,
the third pattern is formed of a fourth pattern adjacent to the first pattern, a fifth pattern adjacent to the second pattern, and a sixth pattern sandwiched between the fourth pattern and the fifth pattern,
the sixth pattern includes a first raster line and a second raster line,
in the first raster line, a first dot group in which first dots are successively formed by the plurality of first nozzles in the first direction and a second dot group in which second dots are successively formed by the plurality of second nozzles in the first direction are alternately formed in the first direction,
in the second raster line, the second dots adjacent to the first dots of the first raster line in the second direction and the first dots adjacent to the second dots of the first raster line in the second direction are formed in the second direction, and
in the fourth pattern and the fifth pattern, the first dots and the second dots are alternately formed in the first direction.

5. A recording method for recording a recording image by discharging liquid while a recording head including a first nozzle group and a second nozzle group in which a plurality of nozzles are arrayed in an alignment direction and a recording medium move relative to each other in a first direction that intersects with the alignment direction, the recording image including an overlap image recorded by the first nozzle group and the second nozzle group, and a non-overlap image recorded by the first nozzle group or the second nozzle group, the recording method comprising:
when the overlap image is recorded that includes a first dot group in which first dots are successively formed by the first nozzle group at a predetermined interval in the first direction, a second dot group in which second dots are successively formed by the second nozzle group at the predetermined interval in the first direction, and a third dot group including the first dots and the second dots, which are arrayed at an interval longer than the predetermined interval,
arranging the first dot group and the second dot group at mutually exclusive positions; and
arranging the third dot group at at least one of positions adjacent, in a second direction that intersects with the first direction, to the first dot group and the second dot group.

6. A recording method for recording dots by discharging a droplet onto a recording medium while a first nozzle group in which a plurality of first nozzles are arrayed in an alignment direction and a second nozzle group in which a plurality of second nozzles are arrayed in the alignment direction move relatively in a first direction that intersects with the alignment direction, the first nozzle group and the second nozzle group being provided so that positions of the plurality of first nozzles of the first nozzle group in an end region on one side in the alignment direction and positions of the plurality of second nozzles of the second nozzle group in an end region on the other side in the alignment direction overlap in a second direction that intersects with the first direction, the recording method comprising:

recording on the recording medium, a first pattern recorded by the plurality of first nozzles at positions not overlapping the plurality of second nozzles in the second direction, a second pattern recorded by the plurality of second nozzles at positions not overlapping the plurality of first nozzles in the second direction, and a third pattern recorded by the plurality of first nozzles and the plurality of second nozzles overlapping one another in the second direction, wherein the third pattern is formed of a fourth pattern adjacent to the first pattern, a fifth pattern adjacent to the second pattern, and a sixth pattern sandwiched between the fourth pattern and the fifth pattern, the sixth pattern includes a first raster line and a second raster line, in the first raster line, a first dot group in which first dots are successively formed by the plurality of first nozzles in the first direction and a second dot group in which second dots are successively formed by the plurality of second nozzles in the first direction are alternately formed in the first direction, in the second raster line, the second dots adjacent to the first dots of the first raster line in the second direction and the first dots adjacent to the second dots of the first raster line in the second direction are formed in the second direction, and in the fourth pattern and the fifth pattern, the first dots and the second dots are alternately formed in the first direction.

* * * * *